(12) United States Patent
Hada

(10) Patent No.: US 10,994,529 B2
(45) Date of Patent: May 4, 2021

(54) LIQUID DISCHARGE APPARATUS, DISCHARGE ADJUSTMENT METHOD, AND DISCHARGE ADJUSTMENT PROGRAM

(71) Applicant: Atsushi Hada, Kanagawa (JP)

(72) Inventor: Atsushi Hada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 19 days.

(21) Appl. No.: 16/689,354

(22) Filed: Nov. 20, 2019

(65) Prior Publication Data
US 2020/0171817 A1 Jun. 4, 2020

(30) Foreign Application Priority Data
Nov. 30, 2018 (JP) .............................. JP2018-226139

(51) Int. Cl.
*B41J 2/045* (2006.01)

(52) U.S. Cl.
CPC ....... *B41J 2/04508* (2013.01); *B41J 2/04586* (2013.01)

(58) Field of Classification Search
CPC ... B41J 2/04508; B41J 2/04586; B41J 2/2135
USPC .......................... 347/5, 9, 12–14, 37, 40–42
See application file for complete search history.

(56) References Cited

U.S. PATENT DOCUMENTS

| | | | | |
|---|---|---|---|---|
| 8,226,193 B2 * | 7/2012 | Sugahara | ................. | B41J 2/515 347/13 |
| 8,308,261 B2 * | 11/2012 | Aruga | ................. | B41J 11/0095 347/13 |
| 8,657,408 B2 * | 2/2014 | Ito | ........................ | B41J 2/04501 347/37 |

FOREIGN PATENT DOCUMENTS

| | | |
|---|---|---|
| JP | 2017-056654 | 3/2017 |
| WO | WO2016/152208 | 9/2016 |

* cited by examiner

*Primary Examiner* — An H Do
(74) *Attorney, Agent, or Firm* — IPUSA, PLLC

(57) ABSTRACT

A liquid discharge apparatus includes a head array including heads each having nozzles to discharge liquid onto a recording medium, arranged as a nozzle line in a sub-scanning direction; a moving part to move the head array alternately in the scanning direction and in the sub-scanning direction perpendicular to each other while discharging or not discharging the liquid; and a controller including a memory and a processor. The processor adjusts image data for juncture areas of two heads adjacent to each other in the sub-scanning direction; and drives the head array to discharge the liquid from the nozzles while the moving part moves the head array. The adjusting adjusts the image data such that the image data is thinned to make print rates for the juncture areas smaller at ends of the nozzle lines, and the print rates vary among the juncture areas.

11 Claims, 19 Drawing Sheets

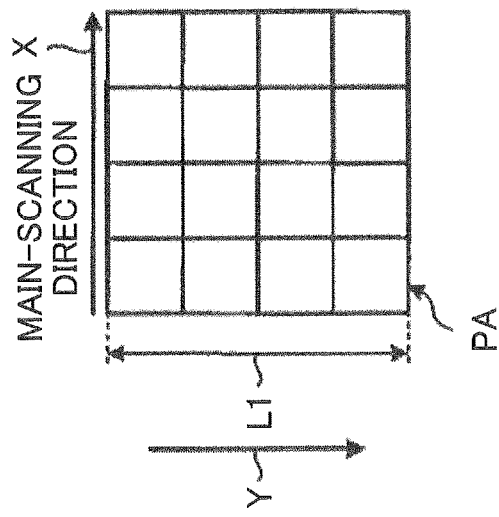

FIG.8E
2-PASS,
1/2-INTERLACING

| 1 | 3 | 1 | 3 |
|---|---|---|---|
| 4 | 2 | 4 | 2 |
| 1 | 3 | 1 | 3 |
| 4 | 2 | 4 | 2 |

FIG.8F
4-PASS,
1/2-INTERLACING

| 1 | 5 | 3 | 7 |
|---|---|---|---|
| 6 | 2 | 8 | 4 |
| 1 | 5 | 3 | 7 |
| 6 | 2 | 8 | 4 |

FIG.8G
2-PASS,
1/4-INTERLACING

| 1 | 5 | 1 | 5 |
|---|---|---|---|
| 6 | 2 | 6 | 2 |
| 3 | 7 | 3 | 7 |
| 8 | 4 | 8 | 4 |

FIG.8H
4-PASS,
1/4-INTERLACING

| 1 | 5 | 9 | 13 |
|---|---|---|---|
| 12 | 16 | 4 | 8 |
| 3 | 7 | 11 | 15 |
| 10 | 14 | 2 | 6 |

FIG.9A
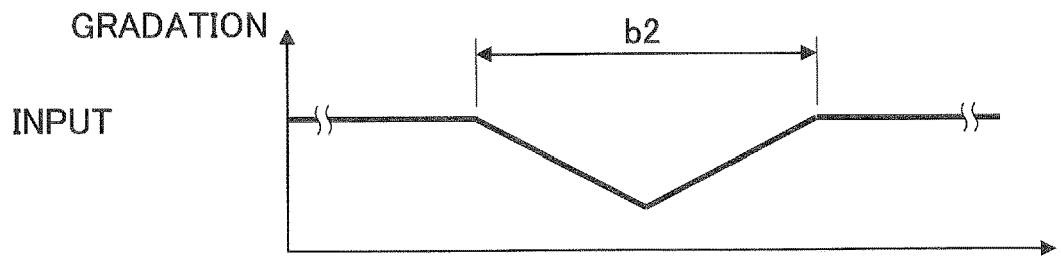
FIG.9B
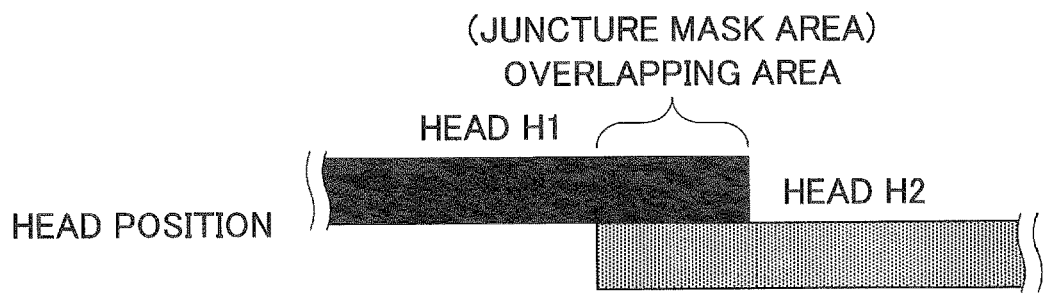
FIG.9C
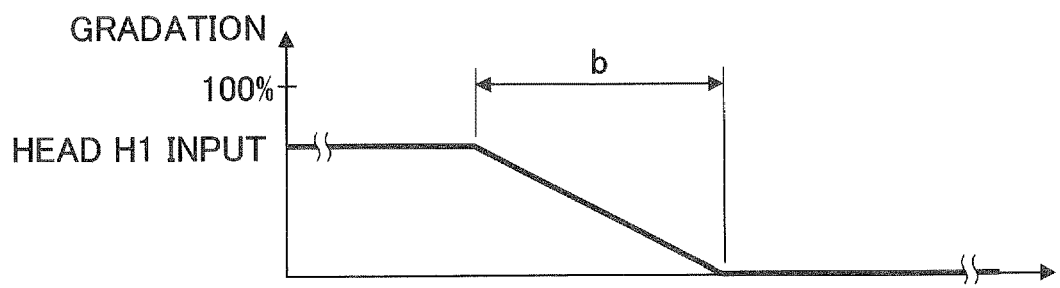
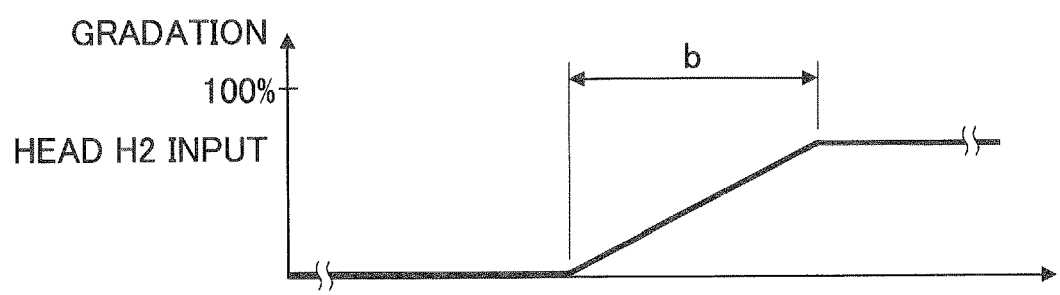

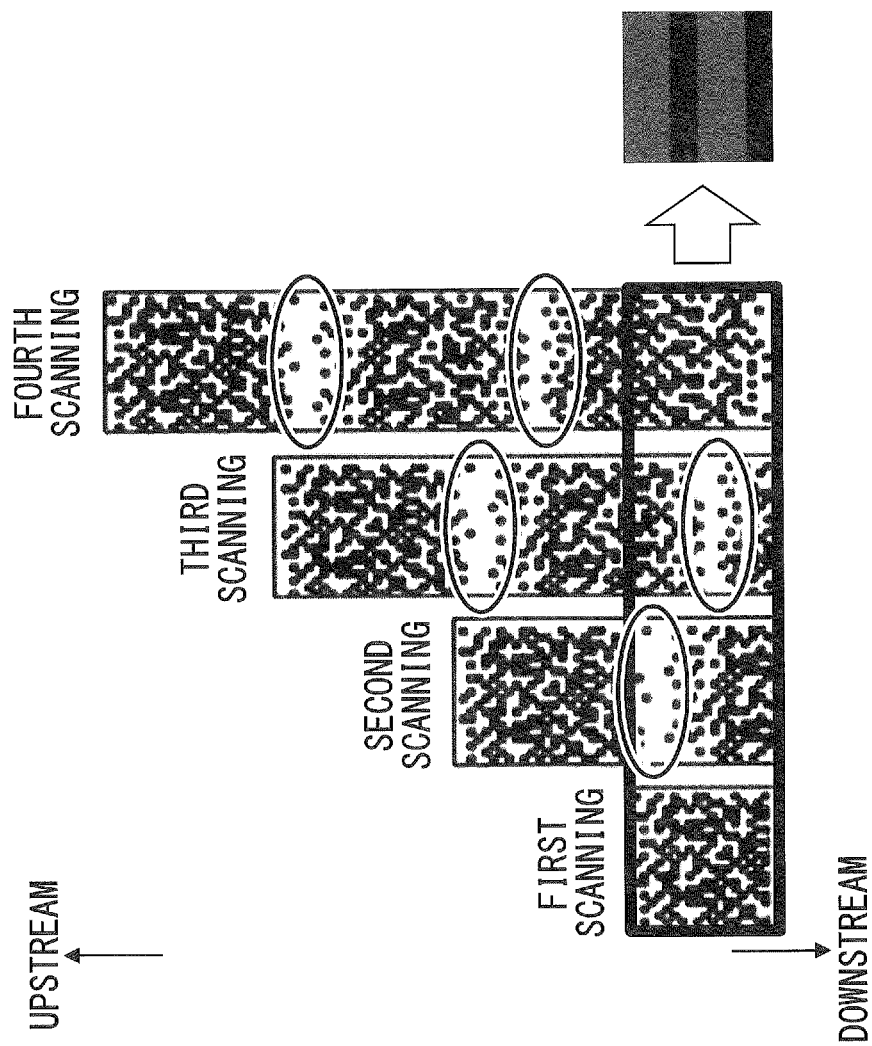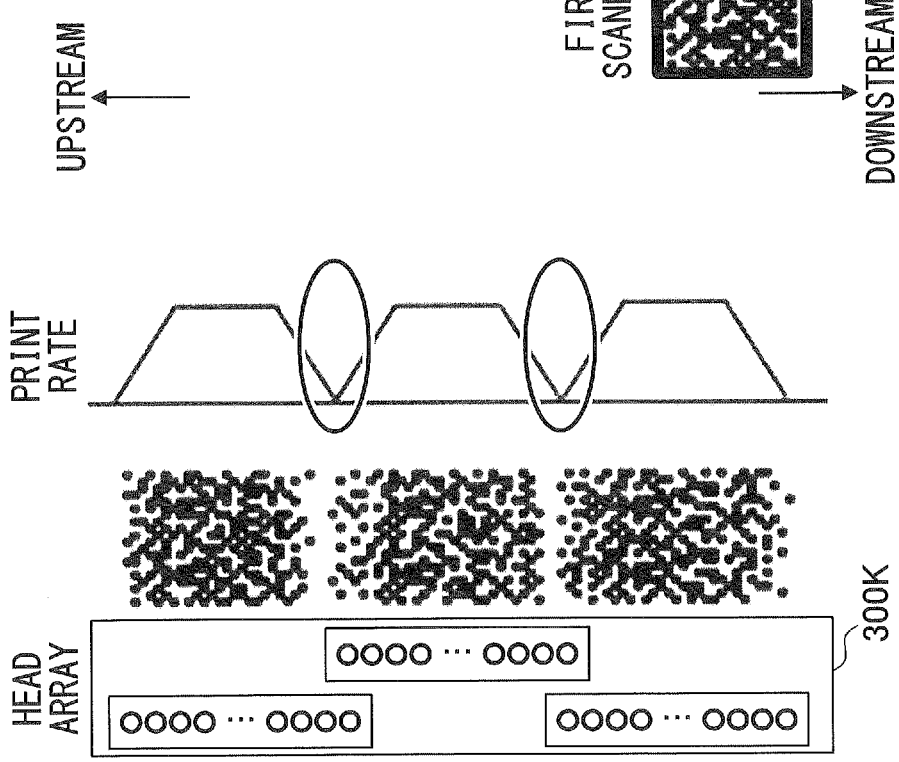

ENTIRELY BLACKENED IMAGE

DOT SHAPES

R  B  G

GRAY  BLACK  GRAY
(DARK)        (LIGHT)

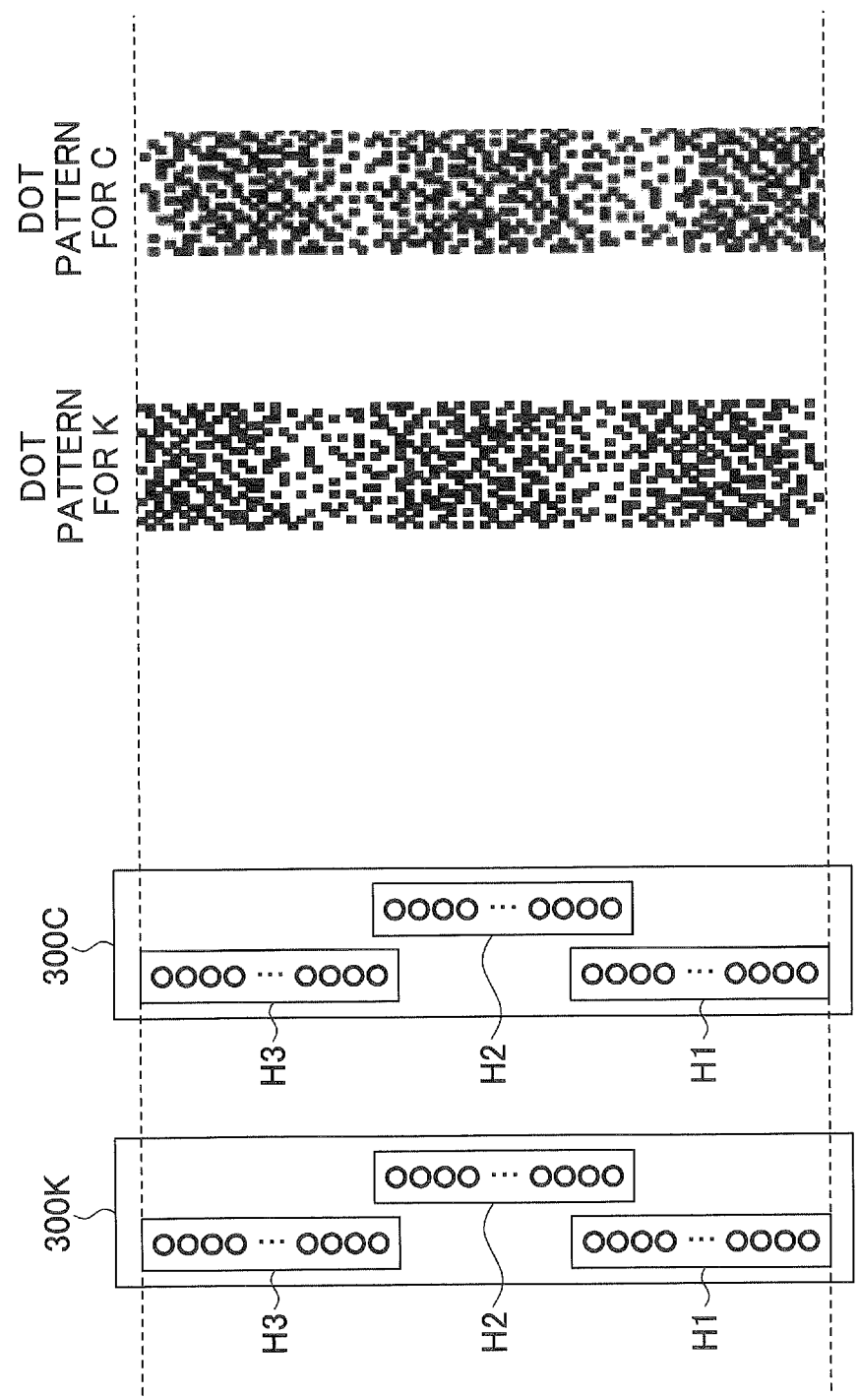

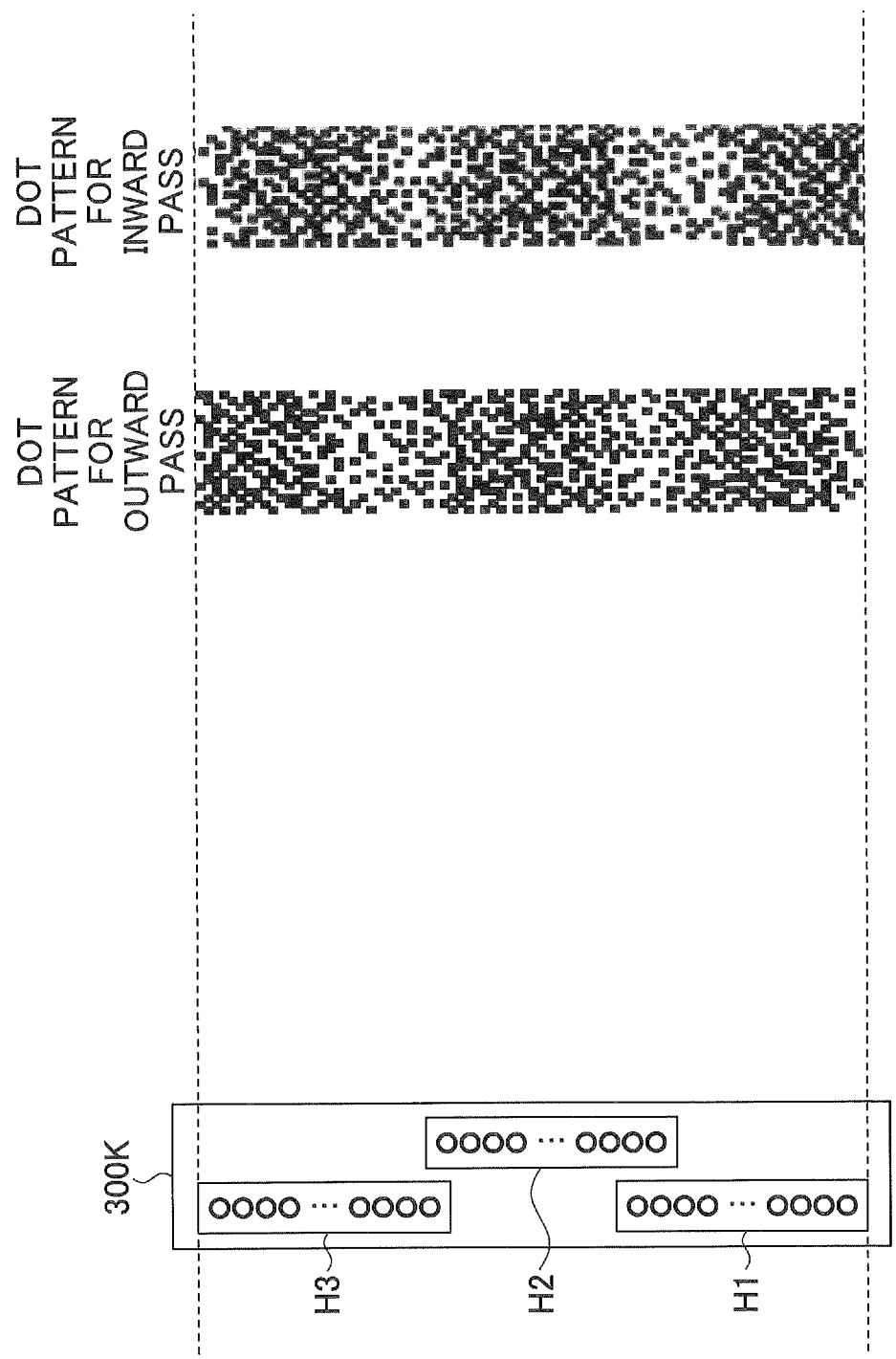

LIQUID DISCHARGE APPARATUS, DISCHARGE ADJUSTMENT METHOD, AND DISCHARGE ADJUSTMENT PROGRAM

BACKGROUND OF THE INVENTION

1. Field of the Invention

The present disclosure relates to a liquid discharge apparatus, a discharge adjustment method, and a discharge adjustment program.

2. Description of the Related Art

Ink-jet recording devices have been known that discharge ink onto a recording medium to form an image, by recording heads that have multiple nozzles to discharge the ink while moving the recording heads relative to the recording medium.

Here, in the case of an ink-jet image forming apparatus that has a head array on which multiple short recording heads are arranged alternately along two lines in the nozzle line direction (sub-scanning direction), on a juncture area over which two recording heads overlap in the sub-scanning direction, more dots are discharged than on the other areas, and thereby, unevenness of the density occurs.

Thereupon, in order to get rid of such unevenness of the density in juncture areas of an image to be formed, Patent Document 1 discloses a structure in which the ink use rate is reduced at the ends of the recording head, which correspond to juncture areas between the recording heads.

Specifically, FIG. 1 illustrates a schematic diagram illustrating positions at which pixels are output by nozzles 922 according to thinned image data in multiple main scanning operations, and distributions of print rates in Patent Document 1 as a conventional technique. The left part in FIG. 1 illustrates relative positions of a head unit 920 in the sub-scanning direction upon two consecutive main scanning operations; the center part illustrates output patterns 980 that designate the positions at which pixels are output in the respective main scanning operations by the nozzles 922 constituting a group of nozzle lines 924 of the head unit 920 illustrated in the left part; and the right part illustrates distributions of the print rates at positions in the sub-scanning direction on the recording medium in the respective main scanning operations. In this technique, the print rate at the central part of each nozzle line 923 is set to 100%, the print rate at junctures between the nozzle lines 923 and both far ends of the nozzle lines 924 is set to 0%, and the print rate varies linearly between 100% and 0%.

Although the technique of Patent Document 1 described above may reduce unevenness of the density in an image to be recorded, in the case of performing bidirectional printing, depending on the order of overlapping of colors of dots, the surface shapes of inks become different between an area where the printing is first performed along the outward pass and an area where the printing is first performed along the inward pass, and thereby, boundaries are generated. Such boundaries having band shapes are generated along the scanning direction, which are generally referred to as banding of a recording image, or so-called unevenness of the gloss.

SUMMARY OF THE INVENTION

According to an aspect in the present disclosure, a liquid discharge apparatus includes a head array including three or more heads in a sub-scanning direction, each of the three or more heads configured to have a plurality of nozzles to discharge liquid onto a recording medium, the plurality of nozzles arranged as a nozzle line in the sub-scanning direction; a moving part configured to alternately perform an operation of moving the head array in a scanning direction perpendicular to the sub-scanning direction with respect to the recording medium while discharging the liquid onto the recording medium, and an operation of moving the head array or the recording medium in the sub-scanning direction relative to the recording medium or the head array without discharging the liquid; and a controller including a memory and a processor. The processor is configured to execute adjusting, upon discharging the liquid, image data for a juncture area in a vicinity of a boundary of two or more heads adjacent to each other in the sub-scanning direction among the three or more heads; and driving, based on the adjusted image data, the head array to discharge the liquid from the plurality of nozzles while the moving part moves the head array relative to the recording medium. The adjusting adjusts the image data, upon discharging the liquid by using the three or more heads adjacent in the head array, such that the image data is thinned so that print rates for two or more juncture areas of the heads become smaller at ends of the nozzle lines constituting the juncture areas than at a part other than the ends, and the print rates vary among the two or more juncture areas.

BRIEF DESCRIPTION OF DRAWINGS

FIGS. 8A to 8H are diagrams illustrating multiple patterns of print sequences;

FIGS. 9A to 9C are explanatory diagrams of gradation in an overlapping area of a mask for a head H1 and a mask for a head H2;

FIGS. 10A to 10B are explanatory diagrams illustrating gradation in juncture areas and overlaps of discharged dot patterns according to a comparative example;

FIG. 16 is a diagram illustrating discharged dots in the case where different juncture area masks are applied to head arrays of different colors;

FIG. 17 is a diagram illustrating discharged dots in the case where different juncture area masks are applied to the outward pass and the inward pass in scanning operations.

DETAILED DESCRIPTION OF THE EMBODIMENTS

In the following, embodiments for carrying out the present inventive concept will be described with reference to the drawings.

In the following, the same elements are assigned the same reference codes, and duplicated descriptions may be omitted.

According to an aspect, it is possible for an image forming apparatus to control unevenness of the density and gloss banding in an image formed by a head array on which multiple heads are arranged.

First Embodiment

First, overall configurations will be described for multiple embodiments of image forming apparatuses, respectively, each of which is an example of a liquid discharge apparatus in the present disclosure.

Figure 1:
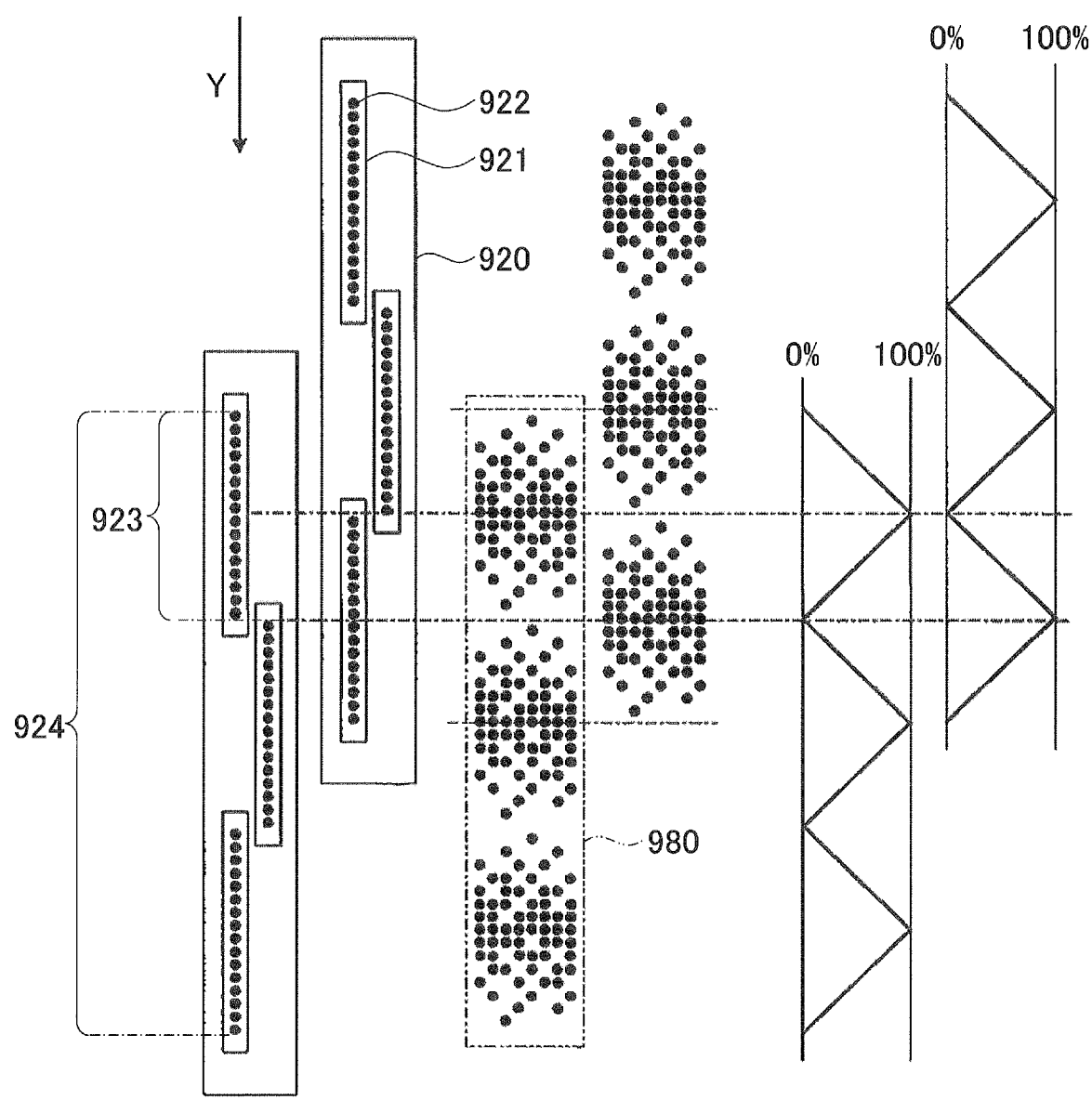
FIG. 1 is a schematic explanatory diagram of print rates at junctures of heads according to a conventional example.
Figure 2:
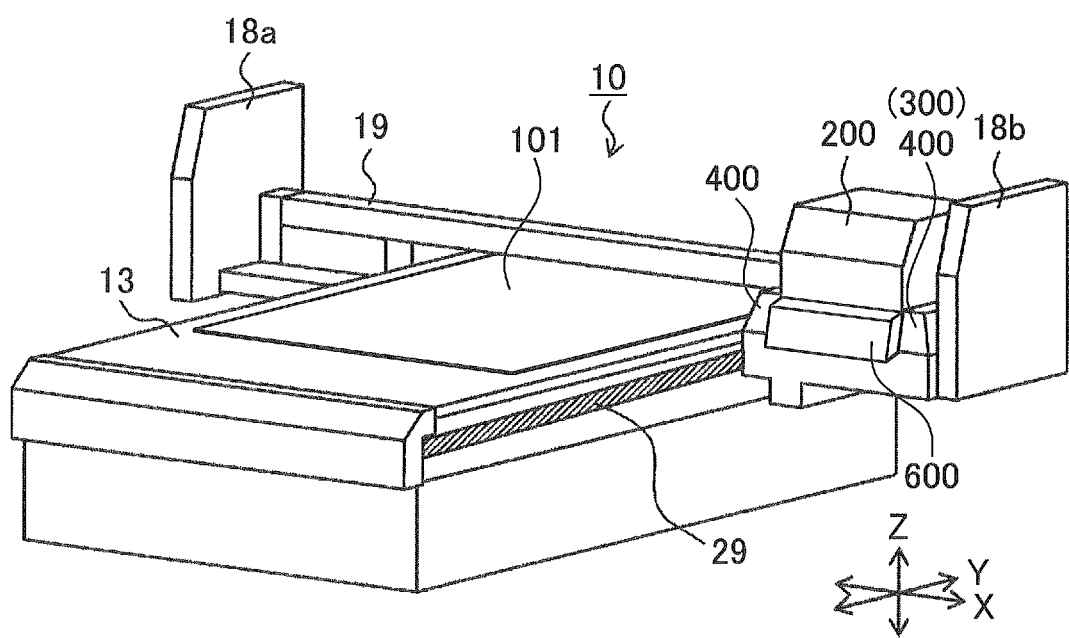
FIG. 2 is a perspective view illustrating an overall structure in an example of an image forming apparatus according to an embodiment in the present disclosure.

FIG. 2 is a perspective view illustrating an overall configuration of an ink-jet recording device as an image forming apparatus according to a first embodiment in the present disclosure.

The ink-jet recording device 10 includes a carriage 200 and a stage 13 on which a recording medium is placed. The carriage 200 is provided with an ink-jet image forming unit 300 that includes multiple liquid discharge heads having multiple nozzles. The carriage 200 discharges liquid from the nozzles of the recording heads to form an image. The image forming unit 300 will be described in detail with reference to FIG. 5. The nozzles are provided on a surface facing the stage 13. Note that in the present embodiment, the liquid is, as an example, an ultraviolet-curable ink.

Also, the surface of the carriage 200 facing the stage 13 is provided with an emission unit 400, which is a light source emitting ultraviolet light. The emission unit 400 (an example of an emitter) emits light having a wavelength that cures the liquid discharged from the nozzles.

A guide rod 19 is provided to bridge the stage 13 between left and right side plates 18a and 18b, and the guide rod 19 holds the carriage 200 to be movable in the X direction (the main scanning direction).

Also, the carriage 200, the guide rod 19, and the side plates 18a and 18b as a whole can move in the Y direction (the sub-scanning direction) along guide rails 29 provided in a lower part of the stage 13. Further, the carriage 200 is held to be movable in the Z direction (vertical direction).

Also, as illustrated in FIG. 2, a gloss detector 600 is provided on the front side of the carriage 200.

Note that in the configuration in FIG. 2, the stage 13 on which a recording medium is placed is fixed. An ink-jet recording device as illustrated in FIG. 2 repeatedly performs a main scanning operation in which ink is discharged from the nozzles onto a recording medium while the recording heads are moved in the main scanning direction, and a sub-scanning operation in which the recording heads are moved in the sub-scanning direction, so as to form an image.

Therefore, in the present embodiment, the carriage 200 and the guide rod 19 function as a moving part in the main scanning direction (X direction or second direction), and the carriage 200 and the guide rail 29 function as a moving part in the sub-scanning direction (Y direction or first direction).

Second Embodiment

Figure 3:
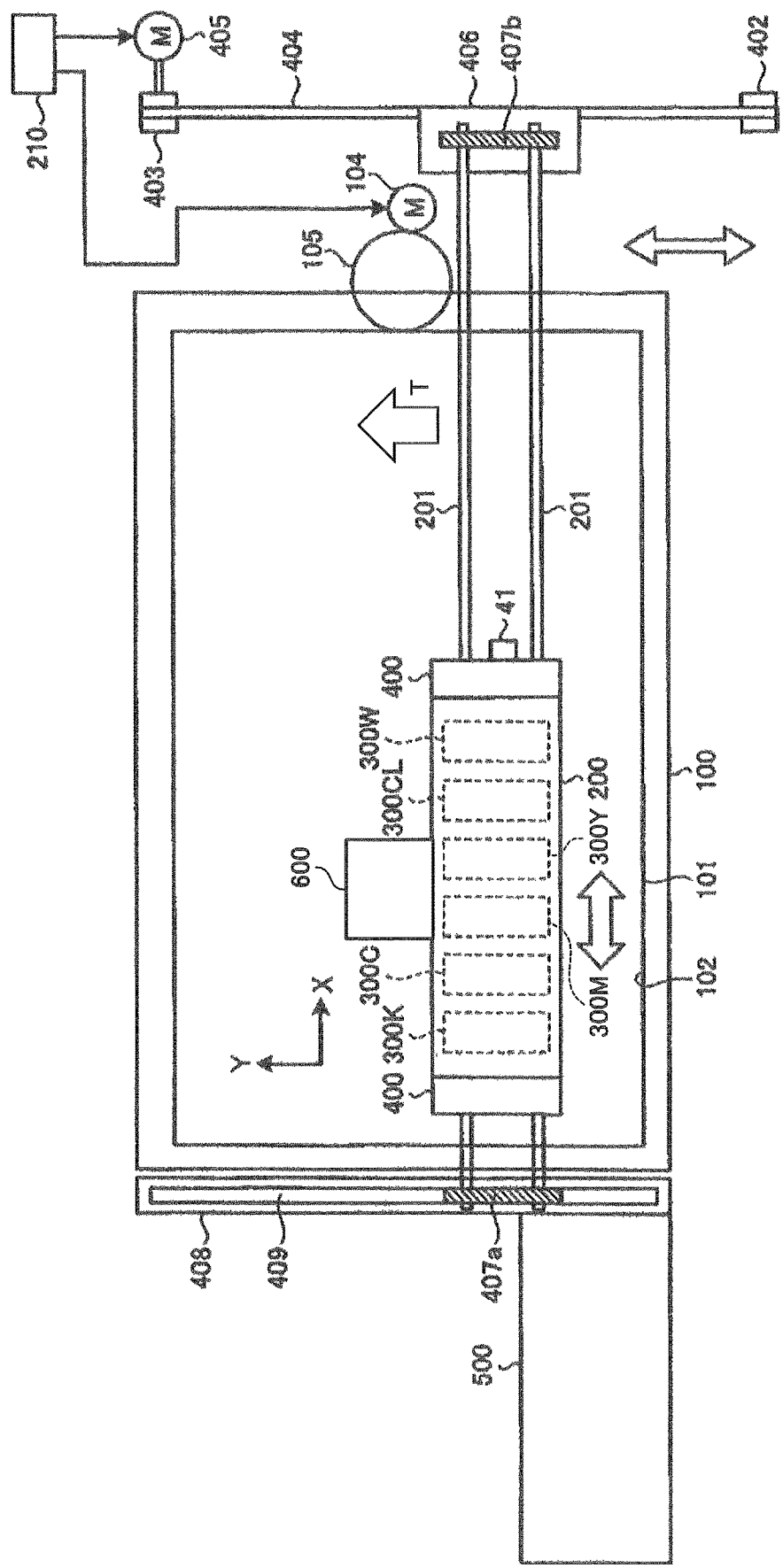
FIG. 3 is a plan view of the surroundings of an image forming unit of an image forming apparatus according to an embodiment in the present disclosure.
Figure 4:
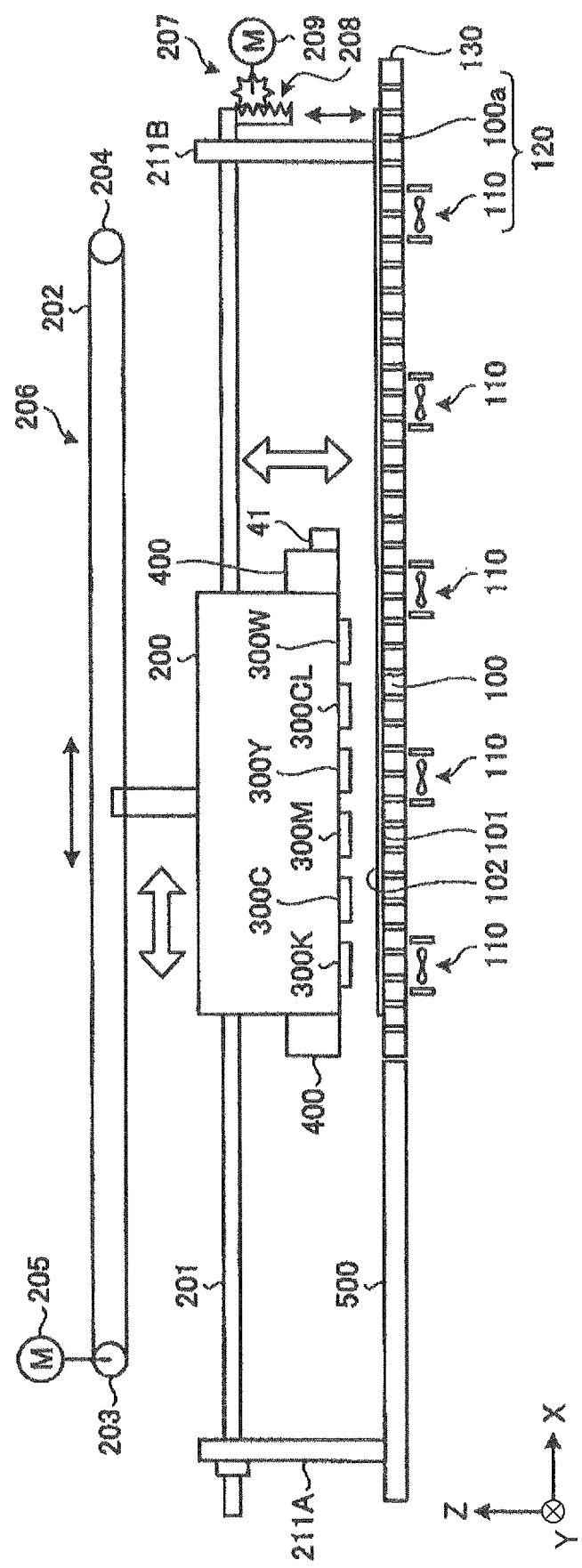
FIG. 4 is a front view of the surroundings of an image forming unit of the image forming apparatus in FIG. 3.

FIG. 3 is a schematic view illustrating an example of a plan view of an ink-jet recording device 1 as an image forming apparatus (liquid discharge apparatus) of a second embodiment in the present disclosure; and FIG. 4 is a schematic view illustrating an example of a front view of the ink-jet recording device 1 of the second embodiment.

Configured as in FIGS. 3 and 4, a stage 130 on which a recording medium 101 is to be placed is movable. In the ink-jet recording device 1 as illustrated in FIGS. 3 and 4, in a sub-scanning operation, a recording medium is moved in the sub-scanning direction relative to the recording head.

A gloss detector 600 detects the degree of gloss of an image formed with droplets on the recording medium 101. Therefore, in the case where the recording head moves in the sub-scanning direction in a sub-scanning operation as illustrated in FIG. 2, the gloss detector 600 is provided at the rear side of the image forming unit 300 in the traveling direction of the sub-scanning direction.

In the case where a recording medium 101 moves in the sub-scanning direction, namely, in the case where the recording medium 101 is conveyed in a sub-scanning operation in the configuration illustrated in FIGS. 3 and 4, the gloss detector 600 is provided on the downstream side in the conveying direction.

Providing such a gloss detector enables to detect the degree of gloss after completion of an image and to feed back the results.

<External Appearance of Image Forming Unit>

Figure 5:
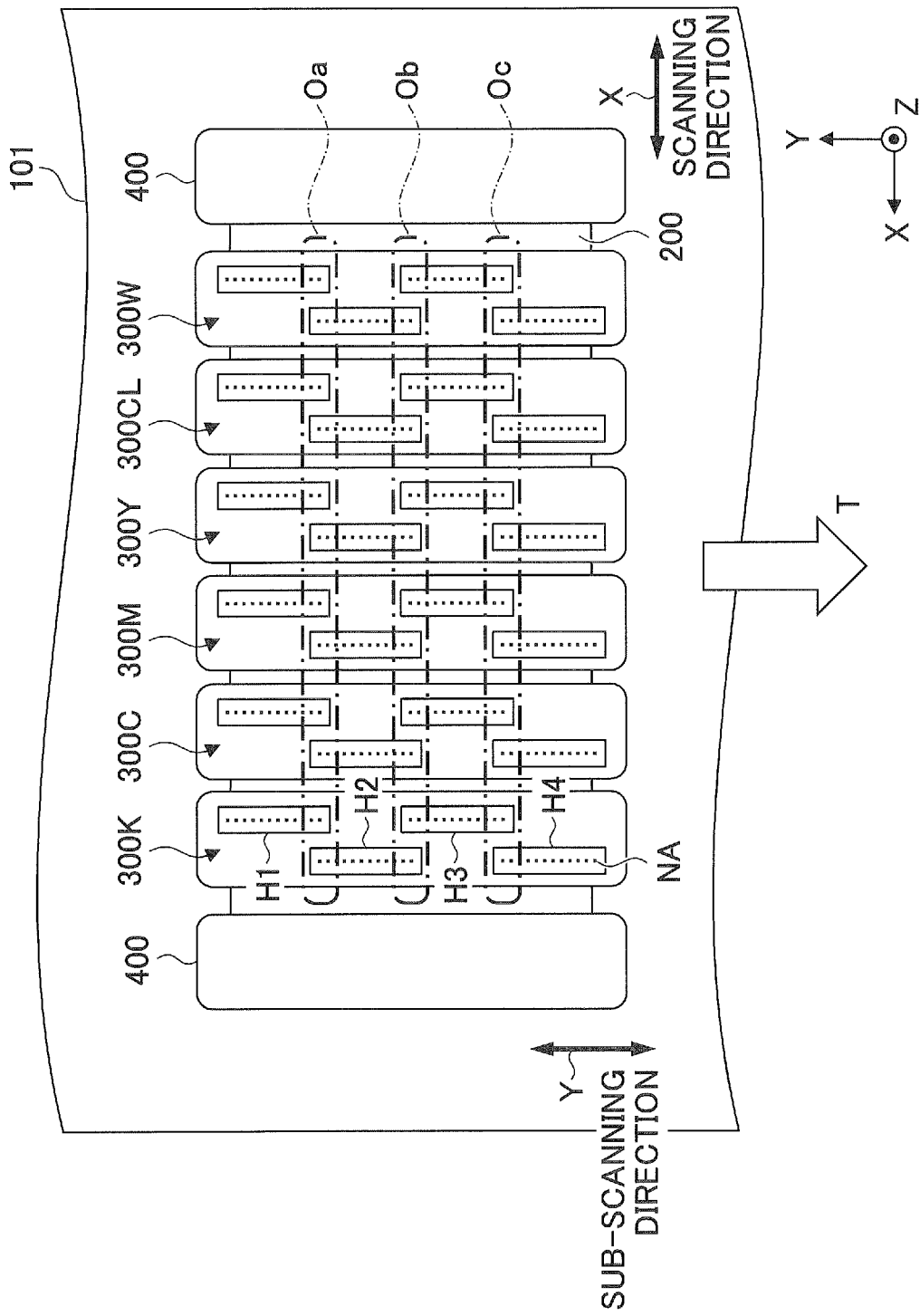
FIG. 5 is a bottom view of the image forming unit of the image forming apparatus in FIG. 3.

Next, an example of the bottom shape of an image forming unit will be described with reference to FIG. 5. FIG. 5 is a schematic bottom view illustrating an example of an overall configuration of a carriage (image forming unit) according to an embodiment in the present disclosure.

As illustrated in FIG. 5, an image forming unit 300 according to the embodiment includes serial-type head arrays. Six head arrays 300K, 300C, 300M, 300Y, 300CL, and 300W corresponding to black (K), cyan (C), magenta (M), yellow (Y), clear (CL), and white (W) are arranged from the left side of FIG. 5.

Also, emission units 400 are provided on both sides of the image forming unit 300. Note that in this figure, illustration of the gloss detector 600 is not omitted.

The head array 300K of black (K) according to the present embodiment has four heads H1, H2, H3, and H4 arranged alternately along two lines in the nozzle line direction Y parallel to the conveying direction T of a recording medium 101. The heads H1, H2, H3, and H4 have respective nozzle lines NA in the X direction.

In each of the heads H1, H2, H3 and H4, multiple nozzles to discharge droplets onto a recording medium P are arranged in a nozzle line direction (first direction). In each of the heads H1, H2, H3 and H4, there may be a single nozzle line, or there may be two or more nozzle lines parallel in the X direction.

In the head array 300K, the ends of the nozzle lines of adjacent heads are arranged to overlap each other in the nozzle line direction Y and to have different positions in the conveying direction T. The nozzle line direction Y is the same direction as the conveying direction T.

In FIG. 5, areas where the ends of the nozzle lines of the adjacent heads overlap each other in the nozzle line direction Y are indicated by thick dotted lines designated with Oa, Ob, and Oc. These areas are referred to as the overlapping areas Oa, Ob, and Oc.

The overlapping ends of the nozzle lines of the adjacent heads in the nozzle line direction Y, enable the image forming unit 300 to form an image on the recording medium 101 seamlessly between the heads in the nozzle line direction Y. Note that the other head arrays 300C, 300M, 300Y, 300CL, and 300W have substantially the same configuration as the configuration of the black (K) head array 300K, and hence, the description is omitted. In the following description, the trailing character after "300" is omitted if there is no need to distinguish colors in particular.

As illustrated in FIG. 4, the image forming unit 300 and the emission unit 400 are moved by the carriage 200 in a direction (the second direction or the X direction) perpendicular to the nozzle line direction relative to the recording medium 101 as an object to be printed, when performing a main scanning operation to discharge ink (droplets) onto the recording medium 101.

Note that although FIG. 5 illustrates an example in which the four heads H1 to H4 are provided in the head array 300K, the number and arrangement of the heads provided in the head array are not limited as such, and can be changed appropriately. Note that in order to perform dot adjustment, which will be described later in the present disclosure, it is favorable to provide three or more heads in each head array.

Next, an example of a hardware configuration of an image forming system including an image forming apparatus (ink-jet recording device 1 or 10) will be described.

Figure 6:
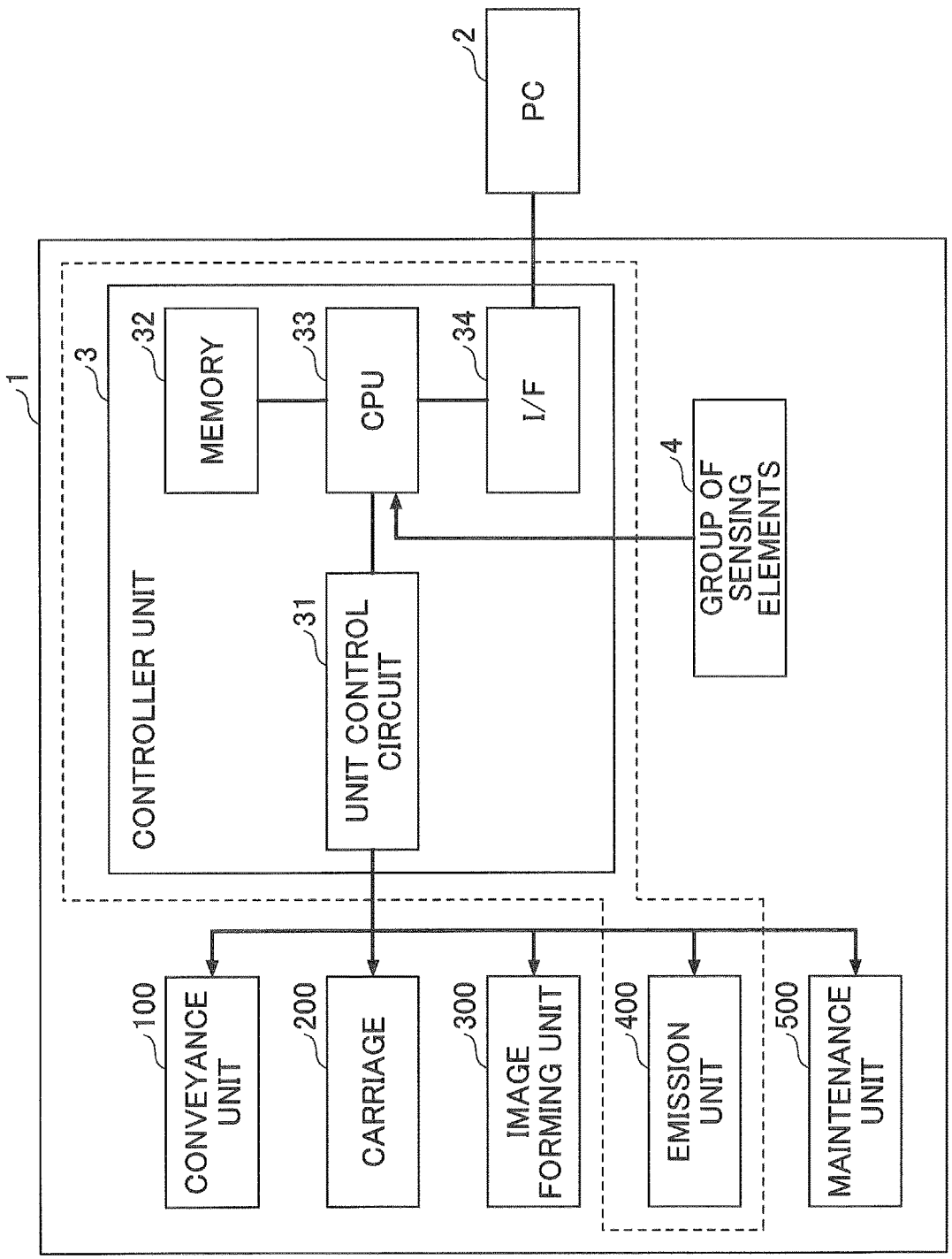
FIG. 6 is a block diagram of a hardware configuration in an example of an image forming apparatus in the present disclosure.

FIG. 6 is a block diagram illustrating an example of a hardware configuration of an image forming apparatus in the present embodiment. In the example of the image forming system illustrated in FIG. 6, a PC 2 as an external device is connected to the image forming apparatus (the ink-jet recording device 1 or 10) that forms an image by the mechanical structure illustrated in FIGS. 2 to 5, and the PC 2 performs image processing. Note that functions related to image processing performed by the PC 2 may be provided in the image forming apparatus.

As illustrated in FIG. 6, the image forming apparatus 30 (ink-jet recording device 1 or 10) of the present embodiment includes a controller unit 3, a group of sensors 4, a conveyance unit 100 as a conveyer, a carriage 200, an image forming unit 300 (an example of a liquid discharge head), an emission unit 400 (an example of an emitter), and a maintenance unit 500.

Also, the controller unit 3 includes a unit control circuit 31, a memory 32, a central processing unit (CPU) 33, and an interface (I/F) 34. Note that a curing device simply needs to be a device that is constituted with at least the controller unit 3 and the emission unit 400 as illustrated by dashed lines in FIG. 6.

The I/F 34 is an interface for connecting the image forming apparatus 30 (1 or 10) to the external PC (Personal Computer) 2. The image forming apparatus 30 (1 or 10) and the PC 2 may have any form of connection; for example, connecting via a network or connecting directly to each other via a communication cable may be considered.

The group of sensors 4 includes various sensors provided on the ink-jet recording device 1, such as, for example, a height sensor 41 illustrated in FIGS. 3 and 4.

The CPU 33 uses the memory 32 as the working area to control operations of the respective units of the ink-jet recording device 1 through the unit control circuit 31. Specifically, the CPU 33 controls operations of the respective units based on recording data received from the PC 2 and data sensed by the group of sensors 4, to form an image as a liquid-coated surface 102 on the recording medium 101 (also referred to as a base material or the like).

Note that a printer driver is installed in the PC 2, and recording data to be transmitted to the ink-jet recording device 1 is generated from image data by the printer driver. The recording data includes command data for moving the conveyance unit 100 or the like of the ink-jet recording device 1 and pixel data of an image to be formed (liquid-coated surface 102). The pixel data is constituted with two-bit data per pixel to represent four levels of gradation.

Next, a mechanical structure constituting the image forming apparatus will be described with reference to FIGS. 3 to 6. The conveyance unit 100 includes a stage 130 and an attraction mechanism 120.

The attraction mechanism 120 includes multiple fans 110 and attraction holes 100a in the stage 130. The attraction mechanism 120 temporarily fixes the recording medium 101 on the conveyance unit 100 by driving the fans 110 to attract the recording medium 101 through the attraction holes 100a. Alternatively, the attraction mechanism 120 may attract paper by using electrostatic attraction. The movement of the conveyance unit 100 in the Y-axis direction (the sub-scanning direction) is controlled based on a driving signal from the CPU 33 (the unit control circuit 31).

In the configuration illustrated in FIGS. 3 and 4, the conveyance unit 100 includes a conveyance controller 210, a roller 105, and a motor 104. The conveyance controller 210 moves the recording medium 101 in the Y-axis direction (the sub-scanning direction) by driving the motor 104 to rotate the roller 105.

Alternatively, the conveyance unit 100 may move the carriage 200 in the Y-axis direction (the sub-scanning direction) as illustrated in FIG. 2 instead of the recording medium 101. In other words, the conveyance unit 100 moves the carriage 200 relative to the recording medium 101 in the Y-axis direction (the sub-scanning direction).

For example, as illustrated on the right side in FIG. 3, the conveyance unit 100 includes a side plate 407b to support two guides 201 for guiding the carriage 200 in the X-axis direction (the main scanning direction), a pedestal 406 to support the side plate 407b, a belt 404 fixed to the pedestal 406, a driving pulley 403 and a driven pulley 402 on which the belt 404 is wrapped around, a motor 405 to rotationally drive the driving pulley 403, and a conveyance controller 210.

Further, as illustrated on the left side in FIG. 3, the conveyance unit 100 includes a side plate 407a to support the two guides 201 for guiding the carriage 200 in the X-axis direction (the main scanning direction), a pedestal 408 to support the side plate 407a in a slidable way, and a groove 409 for guiding the side plate 407a formed in the pedestal 408 in the sub-scanning direction.

The conveyance unit 100 rotates the driving pulley 403 by causing the conveyance controller 210 to drive the motor 405, to move the belt 404 in the Y-axis direction (the sub-scanning direction). Movement of the pedestal 406 supporting the carriage 200 in the Y-axis direction (the sub-scanning direction) along with the movement of the belt 404, enables to move the carriage 200 in the Y-axis direction (the sub-scanning direction). The movement of the pedestal 406 in the Y-axis direction (the sub-scanning direction) also moves the side plate 407a in the Y-axis direction (the sub-scanning direction) along the groove 409 of the pedestal 408.

In the embodiment illustrated in FIGS. 3 and 4, the carriage 200, the pedestal 406, the belt 404, the driving pulley 403, the driven pulley 402, the rotational driving motor 405, and the like function as a moving part in the main scanning direction (the X direction or the second direction). Also, the stage 130, the roller 105, the motor 104, and the like of the conveyance unit 100 function as a moving part in the sub-scanning direction (the Y direction or the first direction).

As illustrated in FIGS. 3 to 5, the image forming unit 300 is constituted with the head arrays 300K, 300C, 300M, 300Y, 300CL, and 300W to discharge UV-curable inks (examples of a liquid) of K, C, M, Y, CL, and W, respectively, which are provided on the downward surface of the carriage 200.

Each of the head arrays includes multiple heads H1 to H4, and each of the head H1 to H4 has piezo elements as drive elements. A driving signal applied to the piezo elements by the CPU 33 (unit control circuit 31) causes the piezo elements to contract, and change in pressure caused by the contraction discharges a UV-curable ink onto the recording medium 101. This discharging forms a liquid-coated surface 102 (an example of a liquid-coated surface) on the recording medium 101.

As UV-curable inks suitable for the present embodiment, for example, inks containing methacrylate-based monomers may be considered. Methacrylate-based monomers have an advantage of relatively weak skin sensitizing properties, and have a property of greater degree of hardening shrinkage than general inks.

The emission units 400 are provided on the side surfaces (surfaces separated in the X-axis direction) of the carriage 200, to emit UV light based on driving signals from the CPU 33 (unit control circuit 31). The emission units 400 are primarily constituted with UV emission lamps to emit UV light.

The movement of the carriage 200 in the Z-axis direction (height direction) and the X-axis direction (main scanning direction) is controlled based on driving signals from the CPU 33 (unit control circuit 31).

The carriage 200 moves along the guide 201 in the main scanning direction (in the X-axis direction) to perform scanning. A scanning part 206 includes a driving pulley 203, a driven pulley 204, a driving belt 202, and a motor 205. The carriage 200 is fixed to the driving belt 202 which extends between and is wrapped around the driving pulley 203 and the driven pulley 204. Driving the driving belt 202 by the motor 205 causes the carriage 200 to move leftward and rightward in the main scanning direction to perform scanning. The guide 201 is supported by side plates 211A and 211B of the body of the device.

The height adjuster 207 includes a motor 209 and a slider 208. The height adjuster 207 drives the motor 209 to move the slider 208 up and down to move the guide 201 up and down. As the guide 201 moves up and down, the carriage 200 moves up and down, which enables to adjust the height of the carriage 200 relative to the recording medium 101.

<Image Forming Operations>

In the following, image forming operations performed by the ink-jet recording device 1 illustrated in FIG. 3 will be described. First, based on a driving signal from the CPU 33 (unit control circuit 31), the conveyance unit 100 moves in the Y-axis direction (sub-scanning direction) to place the recording medium 101 at an initial position for forming an image (liquid-coated surface 102).

Next, based on a driving signal from the CPU 33 (unit control circuit 31), the carriage 200 moves to a height suitable for discharging UV-curable inks by the image forming unit 300 (e.g., a height at which the gap between the lower surfaces of the heads H1 to H4 and the recording medium 101 is 1 mm for the head arrays 300K to W of the image forming unit 300). Note that the height of the image forming unit 300 is sensed by the height sensor 41 to be controlled by the CPU 33.

Next, based on a driving signal from the CPU 33 (unit control circuit 31), the carriage 200 reciprocates in the X-axis direction (the main scanning direction). In this reciprocating movement, the image forming unit 300 discharges the UV-curable inks based on driving signals from the CPU 33 (unit control circuit 31). Thus, an image (liquid-coated surface 102) corresponding to a single scanning operation is formed on the recording medium 101.

Next, once an image (liquid-coated surface 102) corresponding to the single scanning operation has been formed on the recording medium 101, the conveyance unit 100 moves by a width covered by the single scanning operation in the Y-axis direction (sub-scanning direction) based on a driving signal from the CPU 33 (unit control circuit 31).

Thereafter, until formation of an entire image (liquid-coated surface 102) will have been completed, the operation of forming an image (liquid-coated surface 102) corresponding to a single scanning operation and the operation of moving the conveyance unit 100 in the Y-axis direction by the width covered by the single scanning operation are performed alternately and repeatedly.

Then, once the image (liquid-coated surface 102) has been formed on the recording medium 101, waiting time (may be referred to as "leveling time", below) is provided for smoothing the UV-curable inks, and when the waiting time elapses, UV light is emitted by the emission unit 400.

(Functional Blocks)

Figure 7:
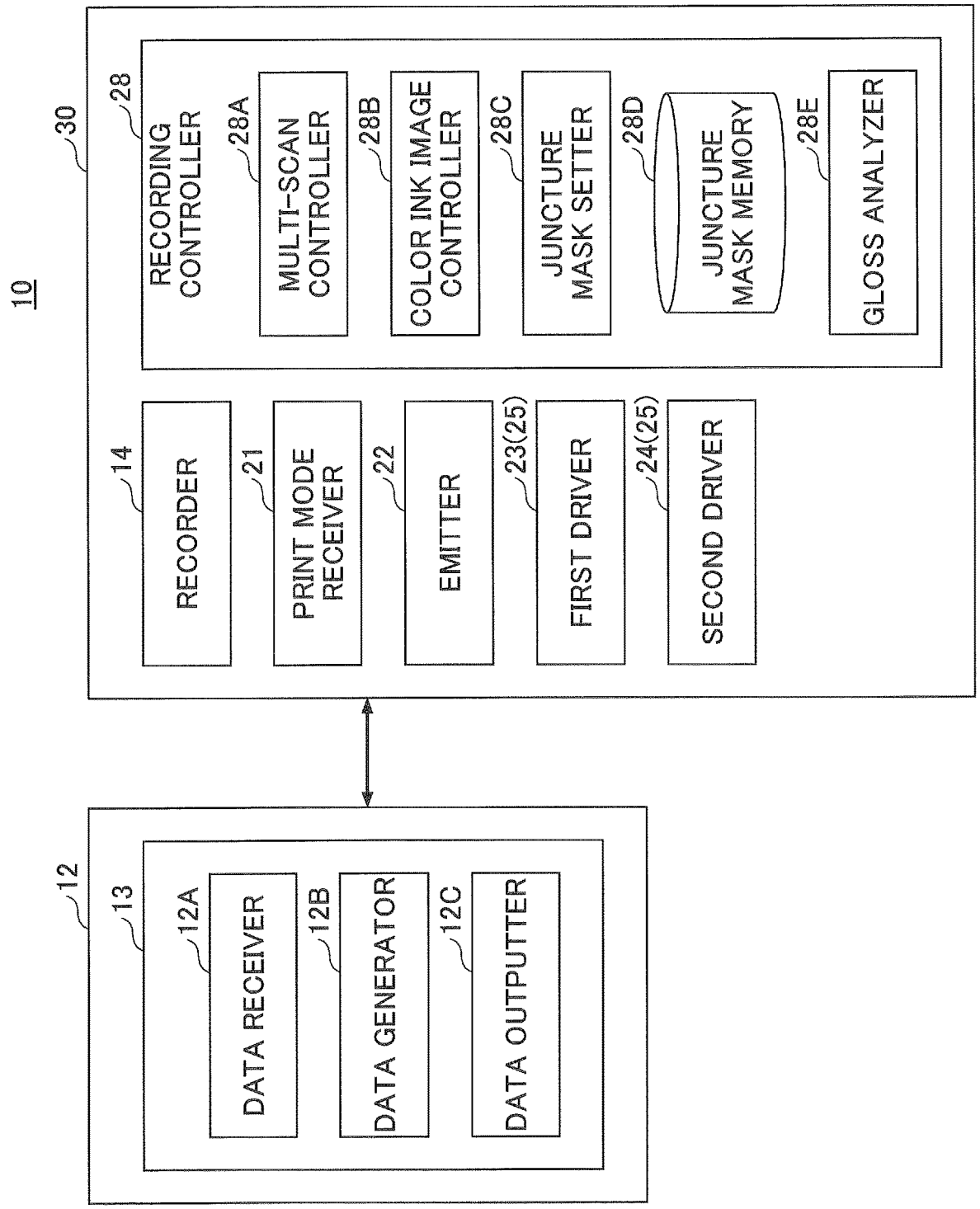
FIG. 7 is a functional block diagram of a controller related to image processing performed by an image forming apparatus in the present disclosure.

Next, functional blocks in the present disclosure will be described. FIG. 7 is a functional block diagram related to image processing performed on an image forming apparatus in the present disclosure.

An image processing device 12 includes a main controller 13. The main controller 13 is a computer configured to include a CPU and the like, and controls the entire image processing device 12. Note that the main controller 13 may be constituted with parts other than a general-purpose CPU; for example, the main controller 13 may be constituted with discrete circuits and the like.

Also, the image processing device 12 may be implemented by the PC 2 illustrated in FIG. 6 to be connected to the image forming apparatus 30, or alternatively, may be provided in the image forming apparatus 30.

The main controller 13 includes a data receiver 12A, a data generator 12B, and a data outputter 12C. Part or all of the data receiver 12A, data generator 12B, and data outputter 12C may be implemented by, for example, running a program on a processing device such as a CPU, in other words, by software; may be implemented by hardware such as ICs (Integrated Circuits); or may be implemented by a combination of software and hardware.

The data receiver 12A receives image data. The image data is information such as the shape and colors of an image to be formed. The data receiver 12A may obtain image data from an external device through a communication unit or may obtain image data from a storage device provided in the image processing device 12.

The data generator 12B performs predetermined data processing, such as masking, with respect to the image data received by the data receiver 12A. In the present embodiment, based on the image data (e.g., JPEG image data) and a desired degree of gloss, the data generator 12B generates image data for color inks and image data for a clear ink.

The data outputter 12C outputs the image data generated by the data generator 12B to the image forming apparatus 30.

the image forming apparatus 30 (1 or 10) includes a recorder 14, a recording controller 28, a driver 25, and an emitter 22.

The recorder 14 is a head driver to drive discharging of droplets by the head arrays 300K to 300W based on image data controlled by the recording controller 28.

The driver 25 drives the moving parts; a first driver 23 drives movement of the carriage 200 in the X direction during a scanning operation; and a second driver 24 drives movement of the carriage 200 or the recording medium 101 in the sub-scanning direction during a sub-scanning operation.

The recording controller 28 receives print data from the image processing device 12. In response to receiving the print data, the recording controller 28 controls the recorder 14, the driver 25, and the emitter 22 so as to discharge droplets corresponding to pixels from the heads H1 to H4.

The recording controller 28 performs, for example, calculating a time from discharging of inks to emission of light; calculating a degree of gloss of an image formed on the recording medium 101 based on the amount of discharged inks and a time to light emission; and calculating the amount of clear ink to be discharged to make the degree of gloss uniform.

The recording controller 28 includes a multi-scan controller 28A, a color ink image controller 28B, a juncture mask setter 28C, a juncture mask memory 28D, and a gloss analyzer 28E.

The multi-scan controller 28A forms an image in an image forming area in which the image is formed, both in the outward direction pass and in the inward pass direction (bidirectional printing) in the main-scanning direction of the carriage 200 on which the recorder 14 is mounted. Also, the multi-scan controller 28A sets a print sequence so as to perform control of forming the image by performing scanning operations at least multiple times in the same image forming area.

The color ink image controller 28B controls image formation of a color ink image based on color ink image data. In other words, the color ink image controller 28B controls the forming order of ink colors, the amount of each ink to be discharged, and the discharge positions (the locations of dots).

When discharging droplets from multiple nozzles of the head arrays 300Y to W based on image data, the juncture mask setter 28C assigns a mask or gradation to each juncture area where the ends of the nozzle lines of adjacent heads overlap each other, to thin out the data so as to adjust the print rate.

Note that the juncture mask setter 28C may adjust the print rate for a juncture area for the heads of all colors, or for the head arrays 300K, 300C, 300M, 300T, and 300W for colors excluding the clear color among the head arrays 300Y to W.

The juncture mask memory 28D stores the print rates at the ends of the nozzle lines set by the juncture mask setter 28C. The juncture mask setter 28C and the juncture mask memory 28D function as a juncture area adjuster.

Here, the print rate is a value that represents a proportion of pixels to which discharge operations to output inks are performed according to values of pixel data, among pixels related to the pixel data corresponding to the nozzles in the heads of a head array.

For example, in the case where a head array performs scanning at a predetermined speed, and specified nozzles can discharge droplets X times (where X is an integer), if the nozzles perform discharging at all positions, the print rate is 100%. However, the nozzles may not perform discharging at all positions. In this case, X is taken as the denominator, and the number of discharging operations of droplets according to the output data (driving data) is taken as the numerator, to obtain the print rate (%).

Also, the gloss analyzer 28E determines whether the gloss of an image on the recording medium 101 is within an acceptable range, based on the gloss of the image formed on the recording medium 101 detected by the gloss detector 600.

Note that although the block diagram illustrates an example in which the image forming apparatus has the function of adjusting the dot discharging at junctures, the data generator 12B of the PC 2 may have the function of adjusting the dot discharging at junctures.

Further, another information processing apparatus (e.g., an upper-level device) connected to the PC 2 may have a program set in advance to store an executable file format (e.g., a CSV (Comma Separated Value) file or Excel file), so that the PC 2 loads the program to execute it as a juncture discharge adjustment program.

<Print Sequences>

Next, print sequences in an image conversion process will be described. FIGS. 8A to 8H are diagrams illustrating patterns of multiple print sequences, or explanatory diagrams of image conversion.

As an image conversion process, the data generator 12B (see FIG. 7) converts image data into recording data items in units of partial images each of which is output by a single scanning operation performed by the image forming unit 300 in the main scanning direction X in accordance with the printing width, the printing order, and the configurations of the heads H1 to H4 of the head arrays 300K to W.

Each square in 4-by-4 squares illustrated in each of FIGS. 8A to 8H represents a single dot of a recording image. Also, the number in the square represents the order of scanning performed by a head. An image is formed by repeating a pattern illustrated in one of FIGS. 8A to 8H in the order in the main scanning direction X and in the sub-scanning direction Y.

Note that the number of selective discharging in the main scanning direction X may be referred to as "pass(es)". In other words, if the number of selective discharging in the main scanning direction X is one, it is referred to as one pass, and if the number is two, it is referred to as two passes.

Also, the number of selective discharging in the sub-scanning direction Y may be referred to as "interlacing". In other words, if the number of selective discharging in the sub-scanning direction Y is one, it is referred to as ⅕ interlacing, and if the number is two, it is referred to as ½ interlacing.

Also, the number of types of selective discharging will be referred to as the selective discharging number N. Specifically, N=1 for 1-pass, ⅕-interlacing illustrated in FIG. 8B. Also, for 2-pass, ⅕-interlacing illustrated in FIG. 8C, or for 1-pass, ½-interlacing illustrated in FIG. 8D, N=2.

Also, for 2-pass, ½-interlacing illustrated in FIG. 8E, N=4. For 4-pass, ½-interlacing illustrated in FIG. 8F, or for 2-pass, ¼-interlacing illustrated in FIG. 8G, N=8. For 4-pass, ¼-interlacing illustrated in FIG. 8H, N=16.

Note that the 1-pass sequences illustrated in FIGS. 8B and 8D may be referred to as a normal mode, and the multi-pass sequences illustrated in FIGS. 8C, 8E, 8F, 8G, and 8H may be referred to as a multi-pass print mode.

In this way, the image forming apparatus causes the carriage 200 including the head arrays 300K to 300W to perform scanning N times (where N is a natural number) in the main scanning direction X while conveying a recording medium P in the sub-scanning direction Y, so as to discharge liquid onto a target area PA in which the length in the sub-scanning direction Y is a predetermined length (length L1) less than or equal to the length that can be covered by a single discharging operation of liquid performed by the head arrays 300K to 300W. Note that N is the same as the number of selective discharging described above.

In the present disclosure, it is presumed that the print rate is reduced in juncture areas in a single scanning operation, and that the same image is scanned in the X direction twice or more; therefore, the print sequence is assumed to be ½ or ¼ interlacing as illustrated in FIGS. 8D to 8G.

Note that the ink-jet recording device 1 or 10 is set with initial settings of a print method, which include a setting of a normal mode, settings of a multi-pass print mode and the multi-pass number, settings of an interlacing print mode and the interlacing number. The specified print mode (the normal mode, the multi-pass print mode, and the interlacing print mode), the multi-pass number, and the interlacing number are stored as the printing method in a storage medium such as a memory (not illustrated).

<Gradation Adjustment>

Next, an example of gradation adjustment in juncture areas will be described with reference to FIGS. 9A to 9C. FIGS. 9A to 9C are explanatory diagrams of gradation obtained by a mask for a head H1 and a mask for a head H2. FIG. 9A illustrates a gradation of an input signal for a head array in a single scanning operation; FIG. 9B is a diagram illustrating the head positions of the heads H1 and H2 in the head array; and FIG. 9C includes diagrams illustrating gradations obtained after applying the masks for the heads H1 and H2 to the heads H1 and H2, respectively.

As illustrated in FIG. 9A, the discharge control in the present disclosure sets the gradation to be gradually reduced around a juncture area between heads in a single scanning operation.

Here, in the overlapping area between the head H1 and the head H2 and its vicinity, the output around the ends of the nozzles is tilted (reduced) toward the ends by multiplying input image data by a coefficient or changing the driving voltage.

FIG. 9A illustrates an example in which the length (the number of nozzles) of a recess in the sub-scanning direction, which is a part where the input gradation (print rate) is reduced, is b2. The length b2 of the part in which the print rate is smaller than the other parts may be longer or shorter than the length of the juncture area illustrated in FIG. 9B.

For example, around the overlapping area of the heads (juncture area) illustrated in FIG. 9B, the gradation obtained as the output of the head H1 and as the output of the head H2 is gradually reduced (gradually decreased dot droplets) as illustrated in FIG. 9C. Alternatively, for the same input, the driving voltage applied to the heads may be reduced toward the ends (gradually decreased dot droplets) so that the amount of discharged droplets is reduced toward the ends of the nozzle lines at the ends of the heads.

Note that as illustrated in FIG. 9C, by performing adjustment in the juncture area between the adjacent heads, the gradation in the juncture area of the two heads is set to be smaller than in an area of the nozzle lines other than the juncture area.

Note that in the present disclosure, bidirectional printing is used in multiple scanning operations to form an image, and droplets constituting the image are selectively discharged in the respective scanning operations. Therefore, as illustrated in FIG. 9C, in a single scanning operation, the gradation of each of the first and second heads H1 and H2 at the area other than the juncture area, and the total gradation of the heads H1 and H2 in the juncture area are controlled not to reach 100%.

Here, as illustrated in FIG. 9C, a range b in which the print rate is reduced for the juncture area in each of the heads H1 and H2 is favorably around ¼ to ⅓ of the length of one head.

<Gradation Adjustment in Comparative Example>

FIGS. 10A to 10B are explanatory diagrams illustrating gradation in juncture areas and overlap of discharged dot patterns according to a comparative example. The left part in FIG. 10A is a bottom view of a head array having multiple heads; the center part illustrates an output pattern representing the output positions of dots; and the right part illustrates a distribution of the print rate at each position in the sub-scanning direction on a recording medium.

In the comparative example, in the case of using three or more adjacent heads in a head array to discharge droplets, the image data is thinned to adjust the print rate so that in juncture areas where the adjacent heads overlap each other, the print rate becomes smaller than in the other areas, namely, the areas other than the ends of nozzle lines that constitute the juncture areas. In addition, in this comparative example, the distribution is formed such that the print rate is 100% around the center of the heads; the print rate is 0% at the junctures of the heads and both far ends of the heads; and the print rate changes linearly between the 100% and 0%.

Further, the same print rate is set for two or more juncture areas between the adjacent heads.

Therefore, when selectively discharging droplets with ½-interlacing or ¼-interlacing to form an image, the print rate for juncture areas is set to be 0% at the lowest point, which is extremely thin.

Here, gloss banding is caused by spread of ink that has been discharged from the heads, which appears notably when the amount of discharged ink varies significantly in the same scanning. In the conventional technique, the amount of discharged ink in juncture areas of adjacent heads in a head array is low, and hence, the amount of discharged ink varies in the same scanning. Further, in a three-head configuration as in FIG. 10A, there are two juncture areas.

Thus, as illustrated in FIG. 10B, when scanning operations are performed four times while shifting in the sub-scanning direction, the amount of discharged ink varies multiple times, and thereby, the gloss banding appears notably.

<Gloss Banding>

Figure 11A:
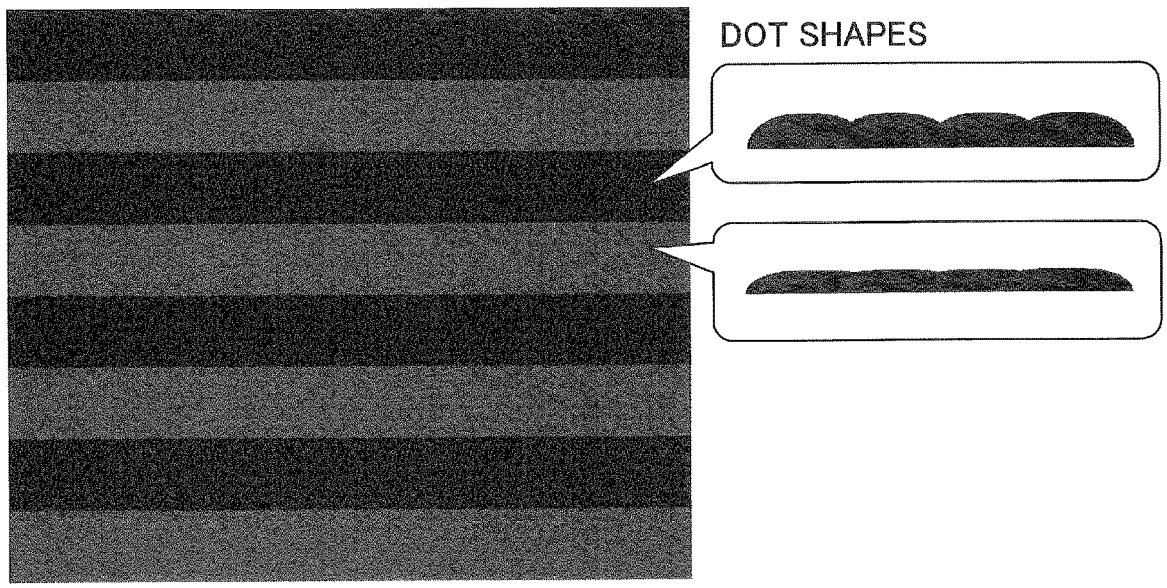
FIGS. 11A to 11B are explanatory diagrams of gloss banding.
Figure 11B:
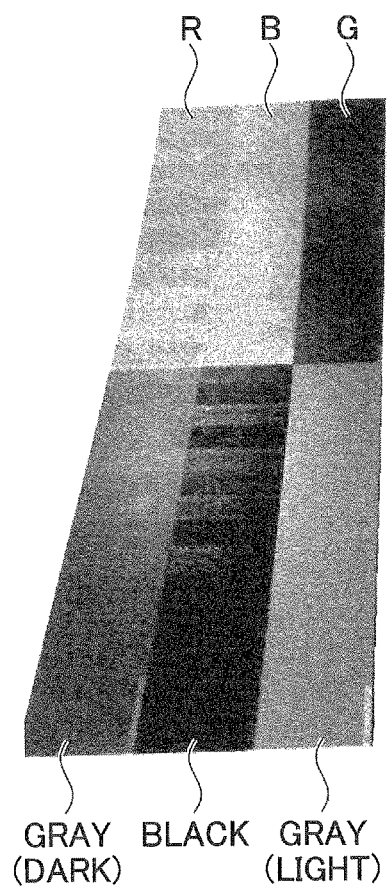

FIGS. 11A to 11B are explanatory diagrams of gloss banding.

In an image forming apparatus that uses a UV-cured ink, in general, time to emit UV light after discharging the ink is adjusted by turning on and off the light emission. For example, the light source is turned off for a scanning operation for discharging the ink, and in the next scanning operation, UV light is emitted without ink-discharging to harden the ink that was discharged in the previous scanning operation. In this case, when the ink chemically reacts with the UV light, cured portions and uncured portions are generated to form boundaries because hardening shrinkage progresses differently depending on the time elapsed after the discharge of the ink.

Such boundaries are generated in band shapes along the scanning direction of the heads as illustrated in FIG. 11A, and thus, gloss banding or unevenness of the gloss is generated due to difference in the height of the ink on a recorded image when the ink hardens.

Also, as illustrated in a photograph of an image in FIG. 11B, the gloss banding appears more notably with darker colors, particularly with black.

<Flow Chart>

Figure 12:
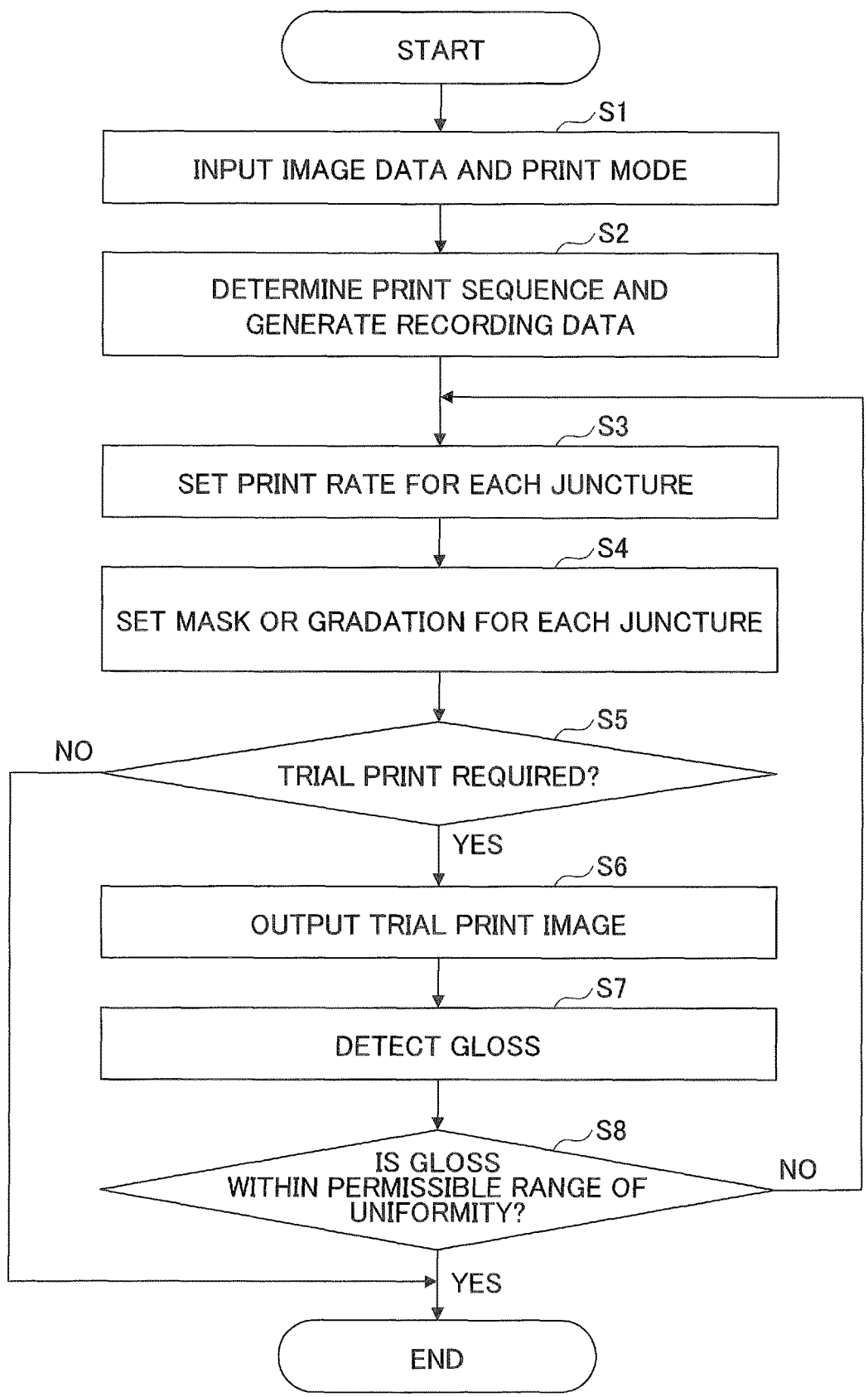
FIG. 12 is a flow chart of a process of setting gradation in juncture areas in the present disclosure.

FIG. 12 is a flow chart of a process of setting gradation in juncture areas in the present disclosure.

At Step S1, image data and a print mode are obtained.

At Step S2, the print sequence is determined and recording data is generated. For example, the print sequence is determined depending on the printing speed and resolution, which are information included in the print mode.

At Step S3, the print rate is set for each juncture area.

At this time, in the head arrays 300K to 300W, the print rates are set to be different for the respective juncture areas. This will be described in detail with reference to FIGS. 13A to 17.

At Step S4, a mask or gradation is set for each juncture area.

Note that in this flow, an example is described in which the setting is performed sequentially for each juncture area. However, the print rates may be set collectively for multiple juncture areas of the head arrays 300K to 300W such that Steps S3 and S4 are combined, for example, with reference to a correlation table between juncture area masks and gloss distributions of images stored in advance or accumulated by experience.

Note that in order to reduce the print rate at juncture areas, juncture area masks and juncture area gradations, which define a group of minimum print rates applied to the head arrays, may be provided uniformly for the multiple head arrays 300K to 300W provided in the image forming unit 300, or may be set individually and differently for the head arrays 300K to 300W of the respective colors (see FIG. 16).

Further, for a head array of one color, for example, 300K, different juncture area masks may be provided for the outward pass and for the inward pass (see FIG. 17).

At Step S5, it is determined whether a trial print image is required. For example, whether a trial print image is required may be determined depending on the importance of an image to be output and/or selection by the user. Note that Step S5 may be executed in a case where, for example, an image (a test image having the same pixel pattern as images to be printed later) is printed as trial printing before printing the same image in a large quantity.

If trial printing is required (YES at S5), trial printing is performed using the group of minimum values for juncture areas set at Steps S3 and S4 (Step S6).

If trial printing is not required (NO at Step S5), the flow is terminated.

At Step S7, the gloss of the output trial printed image is detected by the gloss detector 600.

At Step S8, the detected gloss of the image is analyzed to determine whether or not the uniformity on the image is within an acceptable range. If the gloss is uniform (YES at Step S8), the flow is terminated. If it is determined that the uniformity is not within the acceptable range (NO at Step S8), the flow returns to Step S3 to set a group of print rates (masks or gradations) for the junctures so as to reflect the result of gloss detection.

Repeating these steps of S3 to S7 until the degree of gloss becomes uniform (YES at S8) enables to perform juncture processing more appropriately.

In this flow, the gloss of a completed image output as trial printing can be detected, and the detected gloss can be fed back to the next printing so as to be reflected in the juncture area settings; consequently, it is possible to form a high quality image whose degree of gloss is virtually uniform without the gloss banding.

<First Application Example>

Figure 13A:
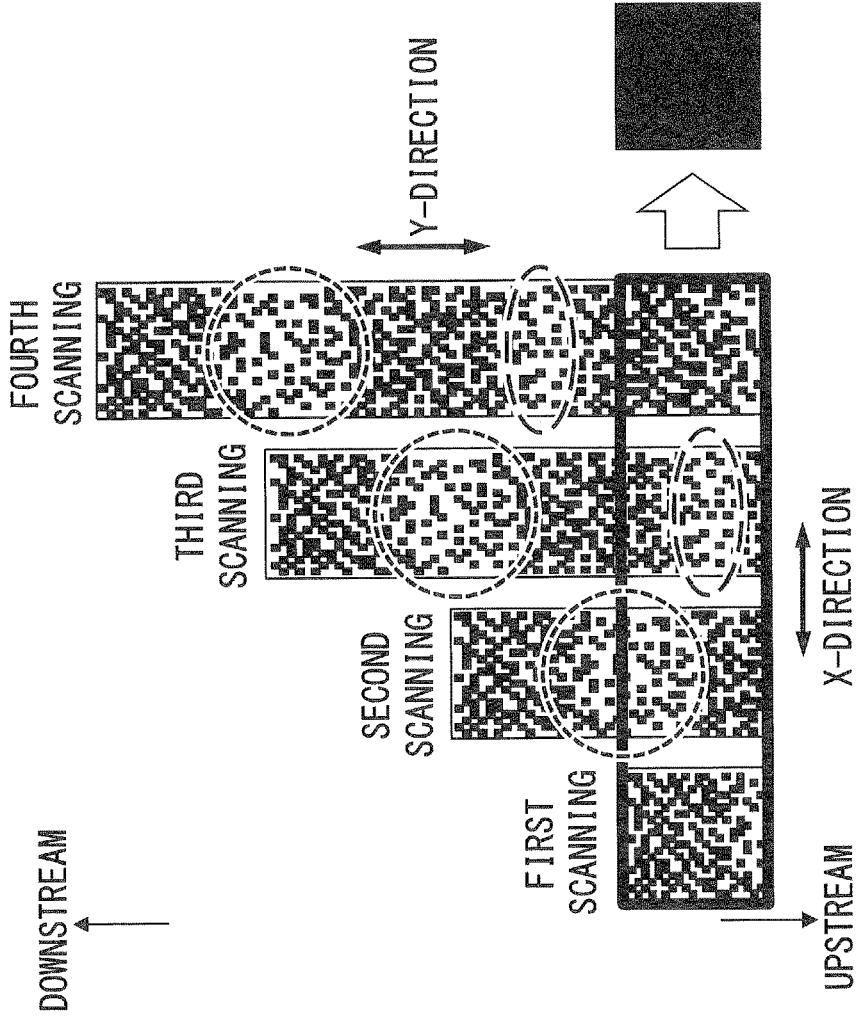
FIGS. 13A to 13B are explanatory diagrams illustrating gradation in juncture areas and overlaps of discharged dot patterns according to a first application example in a head array of a first configuration example in the present disclosure.
Figure 13B:
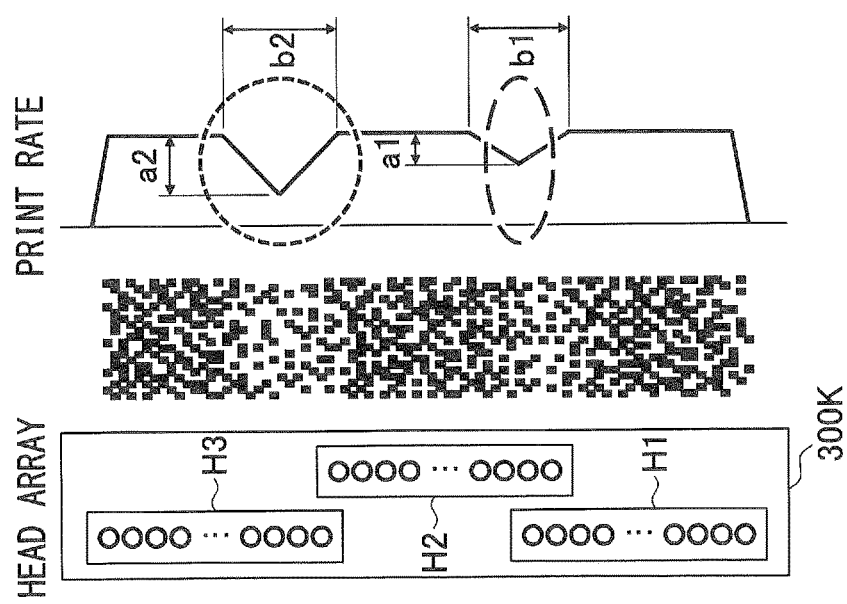

FIGS. 13A to 13B are explanatory diagrams illustrating gradation in juncture areas and overlap of discharged dot patterns according to a first application example in a head array of a first configuration example in the present disclosure. The left part in FIG. 13A is a bottom view of a head array having multiple heads; the center part illustrates an output pattern representing output positions of dots; and the right part illustrates a distribution of the print rate at each position in the sub-scanning direction on a recording medium. FIG. 13B illustrates a schematic view of an output pattern when the output pattern is formed by four scanning operations while shifting in the sub-scanning direction.

In the present disclosure, unlike the comparative example illustrated in FIGS. 10A to 10B, in the head array, the print rates, which are the use rates of two or more junctures, differ from one juncture to another.

Specifically, when three or more adjacent heads H1 to H3 are used to discharge droplets (liquid) in the head array 300K, for each juncture area where the adjacent heads overlap each other, the juncture mask setter 28C adjusts the print rate by thinning the image data so as to make the print rate smaller at the ends of the nozzle lines that constitutes the juncture area compared to the other areas. In this case, as illustrated in FIGS. 13A to 13B, different print rates are set in two or more juncture areas between the adjacent heads.

In the example in FIGS. 13A to 13B, among the print rates of the multiple juncture areas, the print rate is set to be lower in the juncture area closer to the side on which the droplets are to be discharged, than in the juncture area closer to the side on which the droplets have already been discharged onto the recording medium 101. In other words, in the configuration as illustrated in FIGS. 3 and 4 in which the recording medium 101 is conveyed in the sub-scanning operation so as to be moved relative to the head array, among multiple junctures between adjacent heads in a head array, the print rate is set to be lower in the downstream than in the upstream with respect to the conveying direction of the recording medium. Specifically, in FIG. 13A, the thinning rate of the print rate (depth of the recess) a1 on the upstream side is smaller than the thinning rate a2 on the downstream side, and thereby, the print rate is lower in the downstream than in the upstream with respect to the conveying direction.

By varying the use amount at junctures in the upstream and downstream to control the amount of discharged dots in the same scanning operation as in FIGS. 13A to 13B, it is possible to reduce the gloss banding.

Note that in the present disclosure, the print rate is not reduced down to 0% even at a juncture to be set with a smaller print rate. Thus, dots are discharged even if by a small amount; therefore, the image is not extremely thin at the juncture.

In this example, in the case where droplets are discharged by using three or more adjacent heads H1 to H3 in a head array, for two or more juncture areas, the print rate is adjusted to gradually decrease in a V-shape (linearly) toward a minimum print rate set for thinning the image data.

In this way, by varying the use rate at two or more juncture areas from juncture to juncture, as illustrated in FIG. 13B, it is possible to reduce unevenness of the density and gloss banding when forming an image by multiple scanning operations.

Note that upon reducing the print rate, although a distribution in which the print rate is changed linearly in a V-shape is illustrated in FIGS. 13A to 13B; however, the print rate may be changed as a curve such as an S-shaped curve.

Note that in FIGS. 13A to 13B, in order to reduce the print rate for the junctures, the print rate is adjusted by varying the depths a1 and a2 of recesses in the horizontal direction X in the graph with respect to 100% gradation; however, the number of nozzles corresponding to the lengths b1 and b2 in the sub-scanning direction Y of the recesses in the graph may be adjusted to adjust the print rate.

In this case, the number of nozzles at the ends of the nozzle lines constituting a juncture area may not be equivalent to the number of nozzles adjusted to have a low print rate in a recess.

For example, even if setting the print rate as the same, if the number of nozzles to be used in a recess is smaller, the recess forms a sharp slope to change the print rate steeply, whereas if the number of nozzles to be used the recess is greater, the recess forms a gentle slope to change the print rate gradually.

Therefore, it is favorable that the minimum value of the print rate at each juncture can be defined according to image data and the print sequence to be applied, and that the number of nozzles forming each recess is selectable as appropriate.

<Application to Print Sequence>

Figure 14:
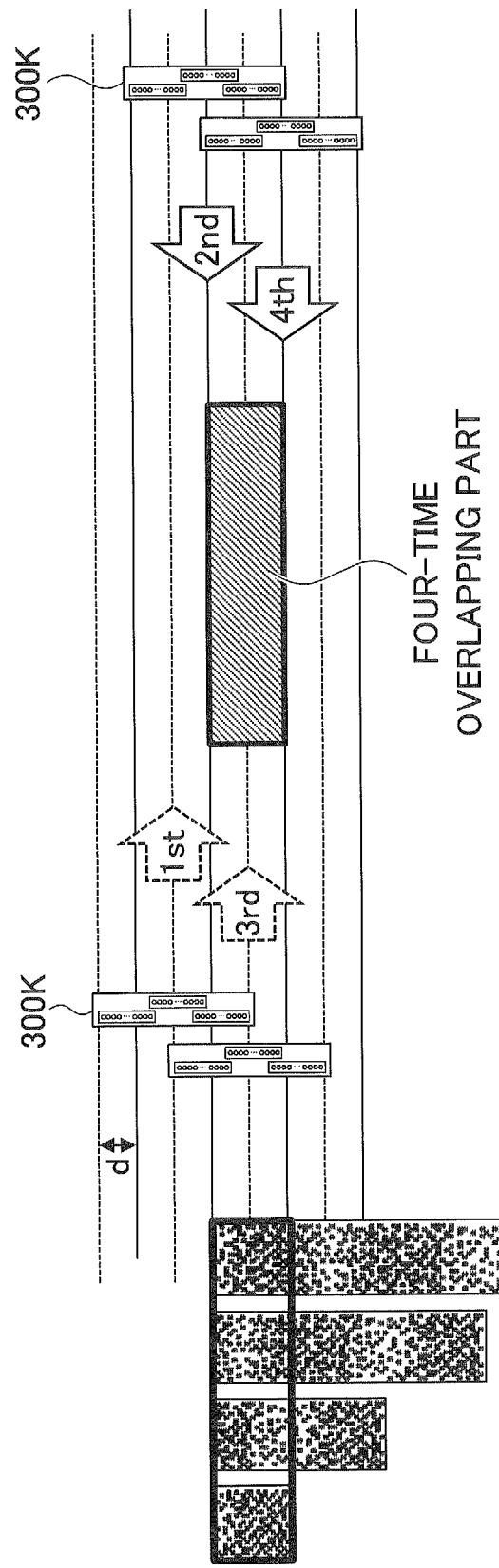
FIG. 14 is a diagram illustrating a result of applying a mask in FIGS. 13A to 13B to a print sequence of forming one image by four scanning operations.

FIG. 14 is a diagram illustrating a result of applying the print rate in FIG. 13A to a print sequence of forming one image by four scanning operations.

In the case of interlacing being other than 1, namely, in the case of performing bidirectional printing in which dots forming an image are selectively discharged in the outward pass and in the inward pass, an operation of moving the head array 300K in the main scanning direction X (second direction) with respect to the recording medium while discharging droplets, and an operation of moving the head array 300 or the recording medium 101 (an object) in the sub-scanning direction Y (first direction) with respect to the recording medium 101 or the head array 300 without discharging droplets, are alternately performed.

Also, for interlacing in which scanning is performed four times (e.g., 2-pass, ½ interlacing or 1-pass, ¼ interlacing), the shift width d is set to be shorter than the length of the head array in the first direction (Y direction), so as to cause the head array to move in the scanning direction X with respect to the recording medium 101 while discharging droplets onto the recording medium 101, such that the outward pass overlaps the inward pass.

Also, in the head array, in an area where the outward pass overlaps the inward pass, droplets forming a single image are selectively discharged in two scanning operations of the outward pass and the inward pass, three scanning operations of the outward pass and the inward pass and the following outward pass, or four scanning operations of the outward pass and the inward pass and the following outward and inward passes.

Note that a bold-frame part designated as "four-time overlapping part" on the right side of FIG. 14 corresponds to another bold-frame part illustrated on the left, in which it can be understood that virtually no gloss banding is generated.

<Second Application Example>

Figure 15B:
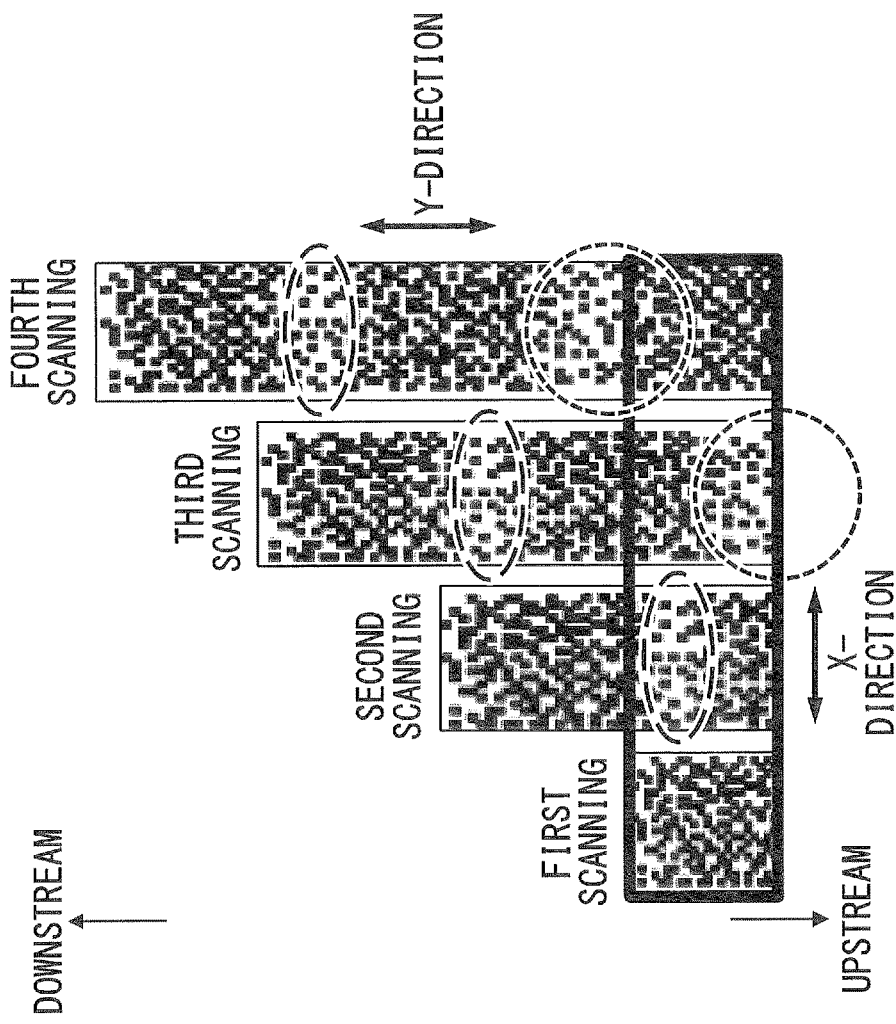
FIGS. 15A to 15B are explanatory diagrams illustrating gradation in juncture areas and overlaps of discharged dot patterns according to a second application example in a head array of a first configuration example in the present disclosure.
Figure 15A:
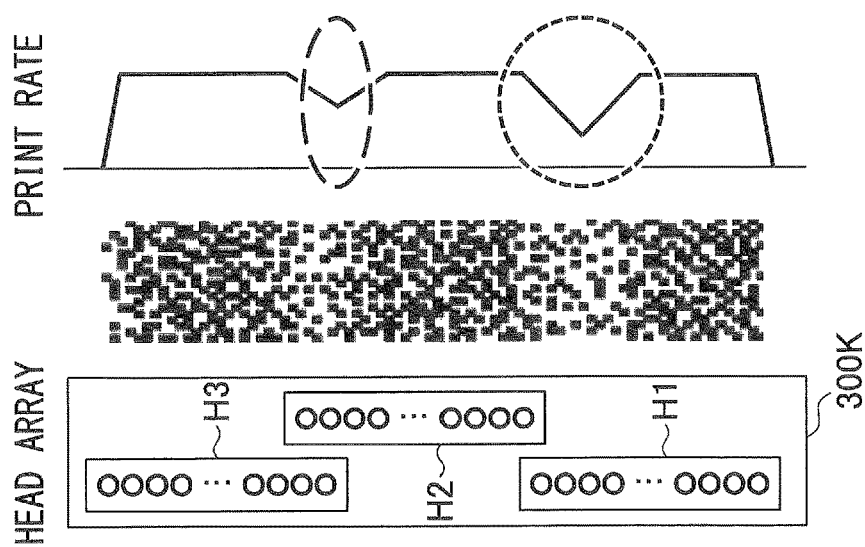

FIGS. 15A to 15B are explanatory diagrams illustrating gradation in juncture areas and overlap of discharged dot patterns according to a second application example in a head array of the first configuration example in the present disclosure. The left part in FIG. 15A is a bottom view of a head array having multiple heads; the center part illustrates an output pattern representing output positions of dots; and the right part illustrates a distribution of the print rate at each position in the sub-scanning direction on a recording medium. FIG. 15B illustrates a schematic view of an output pattern when the output pattern is formed by four scanning operations while shifting in the sub-scanning direction.

In the present application example, among the print rates of the multiple juncture areas, the print rate is set to be higher in the juncture area closer to the side on which the droplets are to be discharged, than in the juncture area closer to the side on which the droplets have already been discharged onto the recording medium 101. In other words, in the configuration as illustrated in FIGS. 3 and 4 in which the recording medium 101 is conveyed in the sub-scanning operation, among multiple junctures between adjacent heads in a head array, the print rate is set to be lower in the upstream than in the downstream with respect to the conveying direction of the recording medium.

Note that in the case of a high resolution, as illustrated in FIGS. 13A to 13B, the effect of controlling the gloss banding becomes higher by setting the print rate lower in the juncture area closer to the side on which the droplets are to be discharged, than in the juncture area closer to the side on which the droplets have already been discharged onto the recording medium 101.

<Application Examples of Colors>

FIG. 16 is a diagram illustrating discharged dots in the case where different juncture area masks are applied to different color head arrays.

In the first application example and the second application example described above, although juncture area masks in a single head array have been described, in practice, as illustrated in FIG. 5, the head arrays 300K to 300W of multiple colors are provided in the image forming unit 300.

Therefore, different types of juncture area masks may be applied to multiple juncture areas between the heads in the respective head arrays 300K to 300W when applying the juncture area masks as a group of print rate values.

Note that although FIG. 16 illustrates discharged dot patterns which are obtained by applying different juncture area masks to the two head arrays 300K and 300C, juncture area masks as a group of print rate values are also applied to the head arrays 300M, 300Y, and 300W having respective colors. In this case, all different juncture area masks may be applied to all of the head arrays 300K-300W having the respective colors, or the same juncture mask may be applied to two or more head arrays among the multiple head arrays.

In this way, using different juncture area masks for colors brings differences among the colors in reduction of the print rates, in the depths a1 and a2 of recesses in the print rate graph, and in the numbers b1 and b2 of the nozzles corresponding to the recesses; therefore, for example, in the case of forming a solid image using multiple colors, it is possible to more effectively curb generation of unevenness of the density and gloss banding.

<Example of Different Settings for Outward Pass and for Inward Pass>

FIG. 17 is a diagram illustrating discharged dots in the case where different juncture area masks are applied to the outward pass and the inward pass in scanning.

For example, in the case of a short shift width d in the sub-scanning direction (see FIG. 14), junctures of the heads in a head array pass close positions in the outward pass and in the inward pass.

Therefore, by applying different juncture area masks in the outward pass and in the inward pass, in other words, by switching the masks between the outward pass and the inward pass, even when the junctures pass close positions in the outward pass and in the inward pass, the recessed shapes of the gradation under this control differ in the outward pass and in the inward pass, and thereby, it is possible to more effectively curb generation of unevenness of the density and gloss banding.

Note that except for the case of switching the masks between the outward pass and the inward pass as illustrated in FIG. 17 and for the case of switching the masks for the colors as illustrated in FIG. 16, it is better not to change the masks for the juncture areas particularly in the case of ½ interlacing, ¼ interlacing, or the like in which droplets are selectively discharged in the scanning direction to form a single image, and in the case of printing to form a single image, for example, between scanning operations during the course of the printing. This is because such a change would also require consideration of the effect of print rates on a juncture area immediately prior to the change, and would make the control complicated.

Conversely, if the resolution or print mode is changed, it is favorable to set juncture area masks suitable for the situation as appropriate.

<Other Configuration Examples of Head Arrays>

As above, examples have been described in which heads are arranged alternately along two lines on a head array; note that the control in the present disclosure can also be applied to a head array on which heads are arranged along a single line.

Figure 18B:
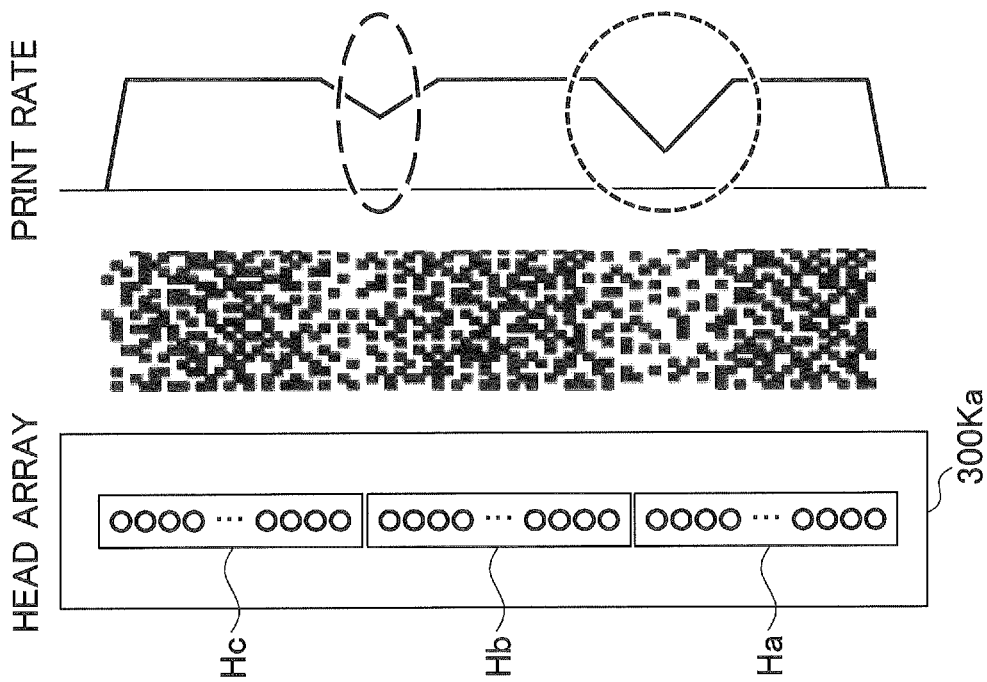
FIGS. 18A to 18B are diagrams illustrating gradation in juncture areas and discharged dot patterns with respect to a head array of a second configuration example in the present disclosure.
Figure 18A:
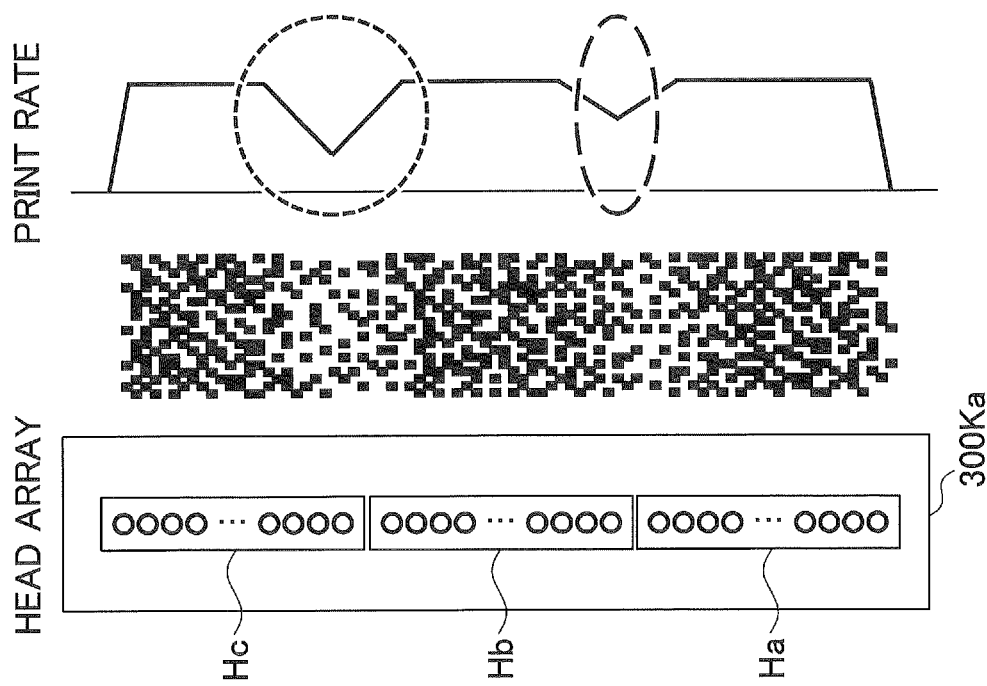

FIGS. 18A to 18B are diagrams illustrating gradation in juncture areas and discharged dot patterns with respect to a head array of a second configuration example in the present disclosure.

A head array 300Ka illustrated in FIGS. 18A to 18B has three or more heads Ha, Hb, and Hc linearly arranged in contact with or close to each other in the sub-scanning direction. In this configuration, a juncture area is defined as the boundary and its vicinity between non-overlapping adjacent heads.

FIG. 18A illustrates gradation and a dot pattern of a juncture area according to the first application example; and FIG. 18B illustrates gradation and a dot pattern of the juncture area according to the second application example.

In the present configuration example, when discharging liquid, a juncture area adjuster adjusts image data with respect to the ends of the nozzle lines around the boundary of the heads adjacent in the sub-scanning direction.

It is also possible in this configuration example, as in the first configuration example, to control generation of unevenness of the density and gloss banding in a formed image, by varying the print rate in two or more juncture areas between adjacent heads in an image forming apparatus having a head array in which multiple heads are arranged in the sub-scanning direction.

As above, favorable embodiments of the present inventive concept have been described in detail. Note that the present inventive concept is not limited to the specific embodiments described above, and various modifications and changes may be made within the scope of the subject matters of the present inventive concept as described in the claims.

Patent Documents

Patent Document 1: Japanese Republished Patent Publication No. 2016/152208

The present application claims priority under 35 U.S.C. § 119 of Japanese Patent Application No. 2018-226139 filed on Nov. 30, 2018, the entire contents of which are hereby incorporated by reference.

What is claimed is:

1. A liquid discharge apparatus comprising:
   a head array including three or more heads in a sub-scanning direction, each of the three or more heads configured to have a plurality of nozzles to discharge liquid onto a recording medium, the plurality of nozzles arranged as a nozzle line in the sub-scanning direction;
   a moving part configured to alternately perform an operation of moving the head array in a scanning direction perpendicular to the sub-scanning direction with respect to the recording medium while discharging the liquid onto the recording medium, and an operation of moving the head array or the recording medium in the sub-scanning direction relative to the recording medium or the head array without discharging the liquid; and
   a controller including a memory and a processor configured to execute
   adjusting, upon discharging the liquid, image data for a juncture area in a vicinity of a boundary of two or more heads adjacent to each other in the sub-scanning direction among the three or more heads, and
   driving, based on the adjusted image data, the head array to discharge the liquid from the plurality of nozzles while the moving part moves the head array relative to the recording medium,
   wherein the adjusting adjusts the image data, upon discharging the liquid by using the three or more heads adjacent in the head array, such that the image data is thinned so that print rates for two or more juncture areas of the heads become smaller at ends of the nozzle lines constituting the juncture areas than at a part other than the ends, and the print rates vary among the two or more juncture areas.

2. The liquid discharge apparatus as claimed in claim 1, wherein the head array has the three or more heads in the sub-scanning direction arranged such that the ends of the nozzle lines of the three or more heads overlap each other in the sub-scanning direction, and are located at different positions in the scanning direction, and
   wherein the adjusting adjusts, upon discharging the liquid, the image data for an area or a vicinity of the area where the ends of the nozzle lines of the adjacent heads overlap each other in the sub-scanning direction, as the juncture area.

3. The liquid discharge apparatus as claimed in claim 1, wherein the head array has the three or more heads arranged linearly in the sub-scanning direction such that the three or more heads contact each other or are located close to each other, and wherein the adjusting adjusts, upon discharging the liquid, the image data for the vicinity of the boundary of the heads adjacent to each other.

4. The liquid discharge apparatus as claimed in claim 1, further comprising:

a gloss detector configured to detect a degree of gloss of an image formed by the liquid on the recording medium, wherein the adjusting adjusts the print rates of the two or more juncture areas based on the detected degree of gloss of the image.

5. The liquid discharge apparatus as claimed in claim 1, wherein the adjusting sets, in the head array, the print rate to be lower in the juncture area closer to a side on which the liquid is to be discharged, than in the juncture area closer to a side on which the liquid has already been discharged onto the recording medium.

6. The liquid discharge apparatus as claimed in claim 1, wherein the adjusting varies, in the case where the liquid is to be discharged by using the three or more heads adjacent in the head array, the number of nozzles at the ends of the nozzle lines for which the image data is thinned so as to reduce the print rate for the two or more juncture areas.

7. The liquid discharge apparatus as claimed in claim 1, wherein the adjusting adjusts the print rate, in the case where the liquid is to be discharged by using the three or more heads adjacent in the head array, for the two or more juncture areas, such that the print rate gradually decreases in a V-shape toward a minimum value of the print rate set upon thinning the image data.

8. The liquid discharge apparatus as claimed in claim 1, further comprising:

a plurality of instances of the head array configured to discharge liquids of respective colors, wherein the adjusting varies, in a case where the liquids are to be discharged by using the three or more heads adjacent in the plurality of instances of the head array, two or more groups of print rates set differently for the two or more juncture areas in the plurality of instances of the head array.

9. The liquid discharge apparatus as claimed in claim 1, wherein in a case where the moving part performs bidirectional printing to discharge the liquid onto the recording medium both in an outward pass and in an inward pass of the head array moved relative to the recording medium in the scanning direction, the adjusting varies, in the case where the liquid is to be discharged by using the three or more heads adjacent in the head array, two or more groups of print rates set varied for the two or more juncture areas, for the outward pass and for the inward pass.

10. A discharge adjustment method executed on a liquid discharge apparatus, wherein the liquid discharge apparatus includes a head array including three or more heads in a sub-scanning direction, each of the three or more heads configured to have a plurality of nozzles to discharge liquid onto a recording medium, the plurality of nozzles arranged as a nozzle line in the sub-scanning direction, a moving part configured to alternately perform an operation of moving the head array in a scanning direction perpendicular to the sub-scanning direction with respect to the recording medium while discharging the liquid onto the recording medium, and an operation of moving the head array or the recording medium in the sub-scanning direction relative to the recording medium or the head array without discharging the liquid, and a controller including a memory and a processor, the discharge adjustment method comprising: causing the controller to execute adjusting, upon discharging the liquid, image data for a juncture area in a vicinity of a boundary of two or more heads adjacent to each other in the sub-scanning direction among the three or more heads; and driving, based on the adjusted image data, the head array to discharge the liquid from the plurality of nozzles while the moving part moves the head array relative to the recording medium, wherein the adjusting adjusts the image data, upon discharging the liquid by using the three or more heads adjacent in the head array, such that the image data is thinned so that print rates for two or more juncture areas of the heads become smaller at ends of the nozzle lines constituting the juncture areas than at a part other than the ends, and the print rates vary among the two or more juncture areas.

11. A non-transitory computer-readable recording medium having a liquid discharge adjustment program stored thereon for causing a liquid discharge apparatus to execute a discharge adjustment method, wherein the liquid discharge apparatus includes a head array including three or more heads in a sub-scanning direction, each of the three or more heads configured to have a plurality of nozzles to discharge liquid onto a recording medium, the plurality of nozzles arranged as a nozzle line in the sub-scanning direction, a moving part configured to alternately perform an operation of moving the head array in a scanning direction perpendicular to the sub-scanning direction with respect to the recording medium while discharging the liquid onto the recording medium, and an operation of moving the head array or the recording medium in the sub-scanning direction relative to the recording medium or the head array without discharging the liquid, and a controller including a memory and a processor, the discharge adjustment method comprising: causing the controller to execute adjusting, upon discharging the liquid, image data for a juncture area in a vicinity of a boundary of two or more heads adjacent to each other in the sub-scanning direction among the three or more heads; and driving, based on the adjusted image data, the head array to discharge the liquid from the plurality of nozzles while the moving part moves the head array relative to the recording medium, wherein the adjusting adjusts the image data, upon discharging the liquid by using the three or more heads adjacent in the head array, such that the image data is thinned so that print rates for two or more juncture areas of the heads become smaller at ends of the nozzle lines constituting the juncture areas than at a part other than the ends, and the print rates vary among the two or more juncture areas.

* * * * *